US008712743B2

(12) United States Patent
Tsukamoto et al.

(10) Patent No.: US 8,712,743 B2
(45) Date of Patent: Apr. 29, 2014

(54) INTAKE PARAMETER-CALCULATING DEVICE FOR INTERNAL COMBUSTION ENGINE AND METHOD OF CALCULATING INTAKE PARAMETER

(75) Inventors: Toshinori Tsukamoto, Saitama-ken (JP); Naoki Oie, Saitama-ken (JP); Masaaki Nagashima, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/635,382

(22) PCT Filed: Mar. 2, 2011

(86) PCT No.: PCT/JP2011/054731

§ 371 (c)(1), (2), (4) Date: Sep. 14, 2012

(87) PCT Pub. No.: WO2011/132464

PCT Pub. Date: Oct. 27, 2011

(65) Prior Publication Data

US 2013/0030776 A1 Jan. 31, 2013

(30) Foreign Application Priority Data

Apr. 23, 2010 (JP) ................................ 2010-099734

(51) Int. Cl.
*G06F 17/10* (2006.01)

(52) U.S. Cl.
USPC ............................................... 703/2; 700/301

(58) Field of Classification Search
CPC ................................................... G06F 17/5018
USPC ............. 703/2; 701/103; 702/45, 47; 700/29, 700/301, 274; 123/344
See application file for complete search history.

(56) References Cited

U.S. PATENT DOCUMENTS

| | | | | |
|---|---|---|---|---|
| 2002/0189254 | A1 | 12/2002 | Shirakawa | |
| 2003/0188712 | A1 | 10/2003 | Miura et al. | |
| 2005/0022782 | A1 | 2/2005 | Ueda et al. | |
| 2006/0100770 | A1 | 5/2006 | Muto et al. | |
| 2006/0276954 | A1 * | 12/2006 | Muto et al. | .................... 701/110 |
| 2008/0189026 | A1 | 8/2008 | Takamiya et al. | |

FOREIGN PATENT DOCUMENTS

| | | | |
|---|---|---|---|
| EP | 1 593 829 | A1 | 11/2005 |
| JP | 08165947 | A * | 6/1996 |
| JP | 2002-309993 | A | 10/2002 |
| JP | 2005-042573 | A | 2/2005 |
| JP | 2007-239607 | A | 9/2007 |
| JP | 2008-151145 | A | 7/2008 |

* cited by examiner

*Primary Examiner* — Kamini S Shah
*Assistant Examiner* — Luke Osborne
(74) *Attorney, Agent, or Firm* — Arent Fox LLP

(57) ABSTRACT

To provide an intake parameter-calculating device and intake parameter-calculating method for an internal combustion engine, which are capable of accurately calculating intake parameters in a case where an intake throttle valve is provided. The intake parameter-calculating device 1 includes an ECU 2. The ECU 2 calculates an error KTHERRCOR using an error model equation (8) (step 2), and calculates a correction coefficient KTHCOR as the reciprocal of the sum of the error KTHERRCOR and 1 (step 3). The ECU 2 calculates a passing air amount GAIRTH by correcting a basic passing air amount GAIRTHN calculated by an equation (11) using a correction coefficient KTHCOR (step 6). A model parameter A for the error model equation (8) is calculated using equations (14) to (18) by onboard identifying calculation with uniform weighting (steps 48 to 53).

17 Claims, 21 Drawing Sheets

FIG. 25

| TH | 1 | 2 | ..... | THB-1 | THB |
|---|---|---|---|---|---|
| KTHERRCOR | KTHERRCOR[1] | KTHERRCOR[2] | ..... | KTHERRCOR[THB-1] | 1 |

INTAKE PARAMETER-CALCULATING DEVICE FOR INTERNAL COMBUSTION ENGINE AND METHOD OF CALCULATING INTAKE PARAMETER

CROSS-REFERENCE TO RELATED APPLICATION

This Application is a National Stage entry of International Application No. PCT/JP2011/054731, having an international filing date of Mar. 2, 2011; which claims priority to Japanese Application No. 099734/2010, filed Apr. 23, 2010; the disclosure of each of which is hereby incorporated in its entirety by reference.

TECHNICAL FIELD

The present invention relates to an intake parameter-calculating device for an internal combustion engine, for calculating intake parameters, such as an intake pressure and an intake air amount in the engine, which indicate a state of air in an intake passage of the engine, and a method of calculating the intake parameters.

BACKGROUND ART

Conventionally, as an intake parameter-calculating device for an internal combustion engine, one disclosed in Patent Literature 1 is known. This intake parameter-calculating device calculates a demanded intake pressure P as an intake parameter, and is equipped with an air flow meter, an intake pressure sensor, a throttle sensor, and so forth. In the intake parameter-calculating device, an accelerator pedal opening Acc, which is an operation amount of an accelerator pedal, is calculated based on a detection signal from the throttle sensor, an actual intake air amount Gact is calculated based on a detection signal from the air flow meter, and an actual intake pressure Pact is calculated based on a detection signal from the intake pressure sensor.

Further, a demanded shaft torque is calculated using the accelerator pedal opening Acc and the rotational speed NE of the engine, and the demanded intake pressure P is calculated using an intake system model expressed by an equation (3), which defines the relationship between the demanded shaft torque and the demanded intake pressure P. The intake system model is derived from the equation of state of gas, and includes a learned value Kn as a multiplication coefficient. The learned value Kn modifies a modeling error, and is calculated by average calculation (weighted average calculation) of an immediately preceding value and a base value Knbase of the learned value Kn. The base value Knbase is calculated by dividing a ratio between the actual intake pressure Pact and the actual intake air amount Gact by a ratio between the demanded intake pressure P and a demanded intake air amount G calculated based on the intake system model.

CITATION LIST

Patent Literature

[PTL 1] Japanese Laid-Open Patent Publication (Kokai) No. 2002-309993

SUMMARY OF INVENTION

Technical Problem

In a case where an intake throttle valve, such as a throttle valve, for changing the area of an opening of an intake passage, is disposed in the intake passage, as in the engine disclosed in PTL 1, the intake pressure has a characteristic that it is susceptible to a change in the degree of opening of the intake throttle valve, since the intake pressure is a pressure in the intake passage on the downstream side of the intake throttle valve. On the other hand, the intake parameter-calculating device disclosed in PTL 1 merely calculates the demanded intake pressure P using the intake system model derived from the equation of state of gas without taking the degree of opening of the intake throttle valve into account, and hence suffers from the problem that the calculation accuracy of the demanded intake pressure P is low. Particularly under a condition in which the degree of opening of the intake throttle valve is apt to change, as in a transient operating condition, the degree of degradation of the calculation accuracy becomes large.

The present invention has been made to provide a solution to the above-described problems, and an object thereof is to provide an intake parameter-calculating device for an internal combustion engine, which is capable of accurately calculating intake parameters in a case where an intake throttle valve is provided, and a method of calculating the intake parameters.

Solution to Problem

To attain the object, the invention as claimed in claim 1 is an intake parameter-calculating device 1 for an internal combustion engine 3, for calculating an intake parameter (passing air amount GAIRTH, intake air amount GAIR, intake pressure PBA) indicative of a state of air in an intake passage 6 in the engine 3 in which an amount of air passing through an intake throttle valve (throttle valve 7*a*) is changed, as a passing air amount, by the intake throttle valve disposed in the intake passage 6, comprising basic intake parameter-calculating means (ECU 2, steps 6, 90, 110, 144, 175) for calculating a basic intake parameter (basic passing air amount GAIRTHN, basic intake air amount GAIRN, basic intake pressure PBAN) as a basic value of the intake parameter, first opening function value-calculating means (ECU 2, steps 14, 103, 123, 154, 183) for calculating a first opening function value (model equation value KTHCAL) as a first calculated value of an opening function value, using a model equation [equations (7), (13), (23)] derived by a predetermined modeling method and defining a relationship between an upstream-side pressure (atmospheric pressure PA) which is a pressure in the intake passage 6 on an upstream side of the intake throttle valve, a downstream-side pressure (intake pressure PBA) which is a pressure in the intake passage 6 on a downstream side of the intake throttle valve, the opening function value KTH determined by a degree of opening of the intake throttle valve, and the passing air amount GAIRTH, second opening function value-calculating means (ECU 2, steps 11, 100, 120, 151, 180) for calculating a second opening function value (map value KTH) as a second calculated value of the opening function value, using a correlation model (FIG. 2) representative of a correlation between the degree of opening of the intake throttle valve (throttle valve opening TH) and the opening function value KTH, correction value-calculating means (ECU 2, steps 3, 100 to 107, 120 to 131, 142, 146, 147, 172) for calculating a correction value (correction coefficient KTHCOR, correction coefficient KAFMERR, correction term PBAERRCOR) using a function value ratio (function value error KTHERR) which is a ratio between one and the other of the calculated first opening function value and the calculated second opening function value, and intake parameter-calculating means (ECU 2, steps 6, 91, 111, 144, 175) for calculating the intake parameter (passing air amount GAIRTH, intake air amount GAIR, intake pressure PBA) by correcting the basic intake parameter using the calculated correction value.

According to this intake parameter-calculating device for an internal combustion engine, the first opening function value is calculated using the model equation defining the relationship between the upstream-side pressure which is a pressure in the intake passage on the upstream side of the intake throttle valve, the downstream-side pressure which is a pressure in the intake passage on the downstream side of the intake throttle valve, the opening function value determined by the degree of opening of the intake throttle valve, and the passing air amount. The second opening function value is calculated using the correlation model representative of the correlation between the degree of opening of the intake throttle valve and the opening function value. The correction value is calculated using the function value ratio which is a ratio between one and the other of the calculated first opening function value and the calculated second opening function value. The intake parameter is calculated by correcting the basic intake parameter using the correction value calculated as above. In this case, the first and second opening function values are both determined by the degree of opening of the intake throttle valve, and the intake parameter is calculated by correcting the basic intake parameter using the correction value calculated using the ratio between the two opening function values. This makes it possible to calculate the intake parameter while causing the state of opening of the intake throttle valve to be reflected thereon. In addition to this, the function value ratio which is the ratio between one and the other of the first opening function value and the second opening function value represents a difference between the two opening function values, that is, an error between the model equation and the correlation model, so that it is possible to calculate the correction value as one which is capable of correcting such an error. From the above, the intake parameter can be calculated more accurately than by the conventional intake parameter-calculating device even under a condition in which the degree of opening of the intake throttle valve is apt to change, as in a transient operating condition, whereby it is possible to enhance marketability.

The invention as claimed in claim 2 is the intake parameter-calculating device 1 as claimed in claim 1, wherein the basic intake parameter-calculating means includes basic passing air amount-calculating means (ECU2, steps 6, 144, 175) for calculating a basic passing air amount GAIRTHN which is a basic value of the passing air amount GAIRTH, as the basic intake parameter, wherein the correction value-calculating means includes first correction value-calculating means (ECU 2, steps 3, 142, 146, 147) for calculating a first correction value (correction coefficient KTHCOR) for correcting the basic passing air amount, as the correction value, and wherein the intake parameter-calculating means includes passing air amount-calculating means (ECU 2, steps 6, 144, 175) for calculating the passing air amount GAIRTH, as the intake parameter, by correcting the calculated basic passing air amount by the calculated first correction value.

According to this intake parameter-calculating device, the basic passing air amount which is a basic value of the passing air amount is calculated as the basic intake parameter, and the first correction value for correcting the basic intake air amount is calculated as the correction value. The passing air amount is calculated as the intake parameter by correcting the calculated basic passing air amount by the calculated first correction value. Therefore, it is possible to calculate the passing air amount while causing the state of opening of the intake throttle valve to be reflected thereon. In addition to this, since the first correction value is calculated as a correction value which is capable of correcting the error between the model equation and the correlation model, it is possible to calculate the passing air amount as a value having such error corrected. From the above, it is possible to accurately calculate the passing air amount.

The invention as claimed in claim 3 is the intake parameter-calculating device 1 as claimed in claim 2, wherein the first correction value-calculating means includes onboard identification means (ECU 2, steps 17, 40 to 53, 157) for identifying onboard a model parameter A of an error model equation (8) that defines a relationship between an error and the degree of opening of the intake throttle valve when the function value ratio is regarded as the error, and calculates the first correction value using the model parameter A identified onboard and the error model equation.

According to this intake parameter-calculating device, the model parameter of the error model equation that defines the relationship between the error and the degree of opening of the intake throttle valve when the function value ratio is regarded as the error is identified onboard, and the first correction value is calculated using the model parameter identified onboard and the error model equation. Therefore, even when the error model equation deviates from the actual relationship between the error and the degree of opening of the intake throttle valve, i.e. even when a modeling error is caused, due to aging and variation between individual products of the intake throttle valve, it is possible to quickly compensate for the modeling error by using the model parameter identified onboard, whereby it is possible to quickly cause the error model equation to match the actual relationship between the error and the degree of opening of the intake throttle valve. This makes it possible to improve accuracy of the correction using the correction value, thereby making it possible to improve the calculation accuracy of the passing air amount.

The invention as claimed in claim 4 is the intake parameter-calculating device 1 as claimed in claim 3, wherein the onboard identification means sets a plurality of weights in a manner associated with a plurality of regions into which the opening of the intake throttle valve is divided, respectively, and calculates an identified value of the model parameter with an identifying calculation algorism [equations (16) to (18)] to which a weighting process using the plurality of weights is applied, and wherein the plurality of weights are set to values equal to each other.

According to this intake parameter-calculating device, the plurality of weights are set in a manner associated with the plurality of regions into which the opening of the intake throttle valve is divided, and the identified value of the model parameter is calculated with the identifying calculation algorism to which the weighting process using the plurality of weights is applied. Further, the plurality of weights are set to values equal to each other. Therefore, during calculation for identifying the model parameter onboard, even when the degree of opening of the intake throttle valve is temporarily biased to one of the regions, and a result of calculation associated with the region temporarily become much larger than results of calculation associated with the other regions, it is possible to properly calculate the identified value of the model parameter while suppressing such a biased result of calculation from being reflected on the identified value, thereby making it possible to ensure excellent calculation accuracy. This makes it possible to further improve the calculation accuracy of the passing air amount.

The invention as claimed in claim 5 is the intake parameter-calculating device as claimed in claim 3, wherein the onboard identification means sets a plurality of weights in a manner associated with a plurality of regions into which the opening of the intake throttle valve is divided, respectively, and calculates an identified value of the model parameter A with an identifying calculation algorism [equations (18), (27), (28)] to which a weighting process using the plurality of weights (weight coefficients KG1 to KG4) is applied, and wherein the plurality of weights are set such that a weight for a region becomes larger as the degree of opening of the intake throttle value of the region is smaller.

According to this intake parameter-calculating device, the respective weights are set in a manner associated with the plurality of regions into which the opening of the intake throttle valve is divided, respectively, and the identified value of the model parameter is calculated with the identifying calculation algorism to which the weighting process using the plurality of weights is applied. The plurality of weights are set such that a weight for a region becomes larger as the degree of opening of the intake throttle value of the region is smaller. In this case, as described hereinafter, the calculation error of the passing air amount is caused by the deviation of the opening area of the intake throttle valve from the value of the opening area of a standard (reference) product thereof, and the degree of influence of the deviation becomes larger as the degree of opening of the intake throttle valve is smaller. Therefore, by setting the weights such that a weight for a region becomes larger as the degree of opening of the intake throttle value of the region is smaller, it is possible to calculate the identified value of the model parameter while causing the degree of influence of deviation of the opening area of the intake throttle valve from the value of the opening area of a standard (reference) product thereof to be reflected thereon, whereby it is possible to further improve the calculation accuracy of the first correction value. This makes it possible to further improve the calculation accuracy of the passing air amount.

The invention as claimed in claim 6 is the intake parameter-calculating device 1 as claimed in any one of claims 2 to 5, wherein the engine 3 is used as a motive power source of a vehicle, and the first correction value-calculating means executes calculation of the first correction value when one of a condition that a predetermined time period has not elapsed after a time point of starting the engine 3 and a condition that a total travelled distance DIST of the vehicle after starting the engine 3 is smaller than a predetermined value DLEARN is satisfied (when the answer to the question of the step 11 or 20 is affirmative (YES)).

According to this intake parameter-calculating device, the calculation of the first correction value is executed when one of the condition that the predetermined time period has not elapsed after a time point of starting the engine, and the condition that the total travelled distance of the vehicle after starting the engine is smaller than the predetermined value is satisfied. In this case, as described hereinafter, the calculation error of the passing air amount is caused by the deviation of the opening area of the intake throttle valve from the value of the opening area of the standard product thereof, and the frequency of occurrence of the deviation is high in a low valve opening region in which the degree of opening of the intake throttle valve is small. When the predetermined time period has not elapsed after the time point of starting the engine, or when the total travelled distance of the vehicle after starting the engine is smaller than the predetermined value, the degree of opening of the intake throttle is liable to range within the low valve opening region. As described above, by performing the calculation of the first correction value only in a region where the calculation error of the passing air amount is liable to occur, it is possible to improve the calculation accuracy of the passing air amount.

The invention as claimed in claim 7 is the intake parameter-calculating device as claimed in any one of claims 2 to 6, further comprising estimated upstream-side pressure-calculating means (ECU 2, steps 61, 64) for calculating an estimated upstream-side pressure (estimated atmospheric pressure HPA) as an estimated value of the upstream-side pressure, and wherein the first opening function value-calculating means calculates the first opening function value using the calculated estimated upstream-side pressure and the model equation.

According to this intake parameter-calculating device, since the first opening function value is calculated using the calculated estimated upstream-side pressure and the model equation, it is possible to avoid a change in the upstream-side pressure from causing degradation of the calculation accuracy of the first correction value, thereby making it possible to ensure excellent calculation accuracy.

The invention as claimed in claim 8 is the intake parameter-calculating device as claimed in claim 7, further comprising downstream-side pressure-detecting means (ECU 2, intake pressure sensor 22) for detecting the downstream-side pressure (intake pressure PBA), and wherein the estimated upstream-side pressure-calculating means sets the estimated upstream-side pressure to a downstream-side pressure detected by the downstream-side pressure-detecting means when the engine 3 is started (step 61).

According to this intake parameter-calculating device, since the estimated upstream-side pressure is set to the downstream-side pressure detected by the downstream-side pressure-detecting means when the engine is started, the first opening function value is calculated using the downstream-side pressure set as above. In this case, during stoppage of the engine, the pressures on the upstream side and the downstream side of the intake throttle valve become approximately equal to each other, and hence the downstream-side pressure detected by the downstream-side pressure-detecting means when the engine is started properly represents the upstream-side pressure. This makes it possible to accurately calculate the first opening function value using the downstream-side pressure which properly represents the upstream-side pressure. In addition to this, after the start of the engine, even when fluctuation of the upstream-side pressure occurs, it is possible to avoid the adverse influence of the fluctuation, thereby making it possible to further improve the calculation accuracy of the first opening function value.

The invention as claimed in claim 9 is the intake parameter-calculating device as claimed in claim 7 or 8, further comprising intake air amount-detecting means (air flow sensor 20) disposed in the intake passage 6 at a location upstream of the intake throttle valve, for outputting a detection signal indicative of an intake air amount GAIR which is an amount of air flowing through the intake passage 6, and intake air amount-calculating means (ECU 2, steps 90, 91) for calculating the intake air amount GAIR based on a result of detection by the intake air amount-detecting means, and wherein the estimated upstream-side pressure-calculating means calculates an estimated passing air amount HGAIRTH which is an estimated value of the passing air amount, using the first correction value (correction coefficient KTHCOR) and the model equation, and updates the estimated upstream-side pressure (estimated atmospheric pressure HPA) based on a result of comparison between the estimated passing air amount HGAIRTH and the calculated intake air amount GAIR (air amount difference DGAIR) (steps 73 to 83).

According to this intake parameter-calculating device, the estimated upstream-side pressure is updated based on the result of comparison between the intake air amount calculated based on the result of detection by the intake air amount-detecting means and the estimated passing air amount. Since the estimated passing air amount is calculated using the first correction value and the model equation, it is possible to ensure high calculation accuracy while compensating for the above-described modeling error in a result of calculation of the estimated passing air amount. Therefore, by updating the estimated upstream-side pressure based on the result of comparison between the thus calculated estimated passing air amount and the intake air amount, it is possible to improve the update accuracy of the estimated upstream-side pressure, i.e. calculation accuracy of the estimated upstream-side pressure.

The invention as claimed in claim 10 is the intake parameter-calculating device as claimed in claim 2, wherein the first correction value-calculating means includes arithmetic mean value-calculating means (ECU 2, step 186) for calculating an arithmetic mean value of one of the function value ratio and the first correction value in a manner associated with each of values of the degree of opening of the intake throttle valve set at predetermined intervals (1°) thereof, and storage means (ECU 2, step 186) for storing the calculated arithmetic mean values in a manner associated with each of values of the degree of opening of the intake throttle valve set at the predetermined intervals thereof, as storage values, and wherein the storage value read from the storage means according to the degree of opening of the intake throttle valve is used as the one of the function value ratio and the first correction value.

According to this intake parameter-calculating device, the arithmetic mean value of one of the function value ratio and the first correction value is calculated in a manner associated with each of values of the degree of opening of the intake throttle valve set at predetermined intervals thereof, and the calculated arithmetic mean values are stored in a manner associated with the values of the degree of opening of the intake throttle valve set at the predetermined intervals thereof as storage values. Further, the storage value read from the storage means according to the degree of opening of the intake throttle valve is used as the one of the function value ratio and the first correction value. In this case, since the storage value is the arithmetic mean value of the function value ratio or the first correction value, the calculation accuracy of the storage value can be improved as the arithmetic mean calculation proceeds. In addition to this, the storage values are stored in a manner associated with the values of the degree of opening of the intake throttle valve set at the predetermined intervals thereof, so that as the predetermined intervals are smaller, the calculation accuracy of the storage value can be made higher. Therefore, since the passing air amount is calculated by using such a storage value as the function value ratio or the first correction value, the calculation accuracy of the passing air amount can be improved as the arithmetic mean calculation proceeds. In addition to this, by setting the predetermined intervals to be smaller, it is possible to further improve the calculation accuracy of the passing air amount.

The invention as claimed in claim 11 is the intake parameter-calculating device as claimed in any one of claims 2 to 8, further comprising intake air amount-detecting means (air flow sensor 20) disposed in the intake passage 6 at a location upstream of the intake throttle valve, for outputting a detection signal indicative of an intake air amount GAIR which is an amount of air flowing through the intake passage 6, upstream-side pressure-detecting means (atmospheric pressure sensor 24) for outputting a detection signal indicative of the upstream-side pressure (atmospheric pressure PA), downstream-side pressure-detecting means (intake pressure sensor 22) for outputting a detection signal indicative of the downstream-side pressure (intake pressure PBA), pressure ratio-calculating means (ECU 2) for calculating a pressure ratio R_P which is a ratio between the downstream-side pressure and the upstream-side pressure, based on results of detection by the upstream-side pressure-detecting means and the downstream-side pressure-detecting means, and valve opening-detecting means (ECU 2, throttle valve opening sensor 21) for detecting a valve opening degree (throttle valve opening TH) as the degree of opening of the intake throttle valve, and wherein the basic intake parameter-calculating means further includes basic intake air amount-calculating means (ECU 2, step 90) for calculating a basic intake air amount GAIRN which is a basic value of the intake air amount GAIR, as the basic intake parameter, based on a result of detection by the intake air amount-detecting means, wherein the correction value-calculating means further includes second correction value-calculating means (ECU 2, steps 100 to 107) for calculating a second correction value (correction coefficient KAFMERR) for correcting the basic intake air amount GAIRN, as the correction value, when the detected valve opening degree is not smaller than a predetermined valve opening degree THB and at the same time the calculated pressure ratio R_P is smaller than a critical pressure ratio R_CRIT, wherein the intake parameter-calculating means further comprises intake air amount-calculating means (ECU 2, step 91) for calculating the intake air amount GAIR, as the intake parameter, by correcting the basic intake air amount GAIRN using the calculated second correction value (correction coefficient KAFMERR), and wherein the first opening function value-calculating means calculates the first opening function value, by using the intake air amount GAIR as the passing air amount.

According to this intake parameter-calculating device, the basic intake air amount, which is a basic value of the intake air amount, is calculated as the basic intake parameter based on the result of detection by the intake air amount-detecting means, and the second correction value for correcting the basic intake air amount is calculated as the correction value when the detected valve opening degree is not smaller than the predetermined valve opening degree and at the same time the calculated pressure ratio is smaller than the critical pressure ratio. The intake air amount is calculated as the intake parameter by correcting the basic intake air amount by the calculated second correction value. The present applicant has confirmed by experiment that in a case where, as in this intake parameter-calculating device, by using the model equation defining the relationship between the upstream-side pressure, the downstream-side pressure, the opening function value, and the passing air amount, i.e. the intake air amount, the first opening function value is calculated and further the function value ratio is calculated, the error between the model equation and the correlation model, represented by the function value ratio, is caused by an error contained in the result of detection by the intake air amount-detecting means when in a region where the valve opening degree is not smaller than the predetermined valve opening degree and at the same time the calculated pressure ratio is smaller than the critical pressure ratio. Therefore, in such a region, the intake air amount can be accurately calculated by correcting the basic intake air amount calculated based on the result of detection by the intake air amount-detecting means, using the second correction value which is capable of correcting the error between the model equation and the correlation model.

The invention as claimed in claim 12 is the intake parameter-calculating device as claimed in claim 11, wherein the basic intake parameter-calculating means further includes basic downstream-side pressure-calculating means (ECU 2, step 110) for calculating a basic downstream-side pressure (basic intake pressure PBAN) which is a basic value of the downstream-side pressure, as the basic intake parameter, based on a result of detection by the downstream-side pressure-detecting means, wherein the correction value-calculating means further comprises third correction value-calculating means (ECU 2, steps 120 to 131) for calculating a third correction value (correction term PBAERRCOR) for correcting the basic downstream-side pressure, as the correction value, when the pressure ratio R_P is not smaller than the critical pressure ratio R_CRIT, and wherein the intake parameter-calculating means further includes downstream-side pressure-calculating means (ECU 2, step 111) for calculating the downstream-side pressure (intake pressure PBA), as the intake parameter, by correcting the basic downstream-side pressure (basic intake pressure PBAN) using the calculated third correction value (correction term PBAERRCOR).

According to this intake parameter-calculating device, the basic downstream-side pressure, which is the basic value of the downstream-side pressure, is calculated, as the basic intake parameter, based on the result of detection by the downstream-side pressure-detecting means, and the third correction value for correcting the basic downstream-side pressure is calculated, as the correction value, when the pressure ratio is not smaller than the critical pressure ratio. The downstream-side pressure is calculated as the intake parameter by correcting the basic downstream-side pressure using the calculated third correction value. The present applicant has confirmed by experiment that in a case where, as in this intake parameter-calculating device, by using the model equation defining the relationship between the upstream-side pressure, the downstream-side pressure, the opening function value, and the passing air amount, the first opening function value is calculated and further the function value ratio is calculated, the error between the model equation and the correlation model, represented by the function value ratio, is caused by an error contained in the result of detection by the downstream-side pressure-detecting means when in a region where the pressure ratio is not smaller than the critical pressure ratio. Therefore, in such a region, the downstream-side pressure can be accurately calculated by correcting the basic downstream-side pressure calculated based on the result of detection by the downstream-side pressure-detecting means, using the third correction value which is capable of correcting the error between the model equation and the correlation model.

The invention as claimed in claim 13 is the intake parameter-calculating device as claimed in claim 2, further comprising intake air amount-detecting means (air flow sensor 20) disposed in the intake passage 6 at a location upstream of the intake throttle valve, for outputting a detection signal indicative of an intake air amount GAIR which is an amount of air flowing through the intake passage 6, upstream-side pressure-detecting means (atmospheric pressure sensor 24) for outputting a detection signal indicative of the upstream-side pressure (atmospheric pressure PA), downstream-side pressure-detecting means (intake pressure sensor 22) for outputting a detection signal indicative of the downstream-side pressure (intake pressure PBA), pressure ratio-calculating means (ECU 2) for calculating a pressure ratio R_P which is a ratio between the downstream-side pressure and the upstream-side pressure, based on results of detection by the upstream-side pressure-detecting means and the downstream-side pressure-detecting means, and valve opening-detecting means (ECU 2, throttle valve opening sensor 21) for detecting a valve opening degree (throttle valve opening TH) as the degree of opening of the intake throttle valve, and wherein the basic intake parameter-calculating means further includes basic downstream-side pressure-calculating means (ECU 2, step 110) for calculating a basic downstream-side pressure (basic intake pressure PBAN) which is a basic value of the downstream-side pressure, as the basic intake parameter, based on a result of detection by the downstream-side pressure-detecting means, when the calculated pressure ratio R_P is not smaller than a critical pressure ratio R_CRIT, wherein the correction value-calculating means further includes third correction value-calculating means (ECU 2, steps 120 to 131) for calculating a third correction value (correction term PBAERRCOR) for correcting the basic downstream-side pressure, as the correction value, when the pressure ratio R_P is not smaller than the critical pressure ratio R_CRIT, and wherein the intake parameter-calculating means further includes downstream-side pressure-calculating means (ECU 2, step 111) for calculating the downstream-side pressure (intake pressure PBA), as the intake parameter, by correcting the basic downstream-side pressure (basic intake pressure PBAN) using the calculated third correction value (correction term PBAERRCOR), when the pressure ratio R_P is not smaller than the critical pressure ratio R_CRIT.

According to this intake parameter-calculating device, it is possible to obtain the same advantageous effects as provided by the invention as claimed in claim 12.

The invention as claimed in claim 14 is the intake parameter-calculating device as claimed in claim 1, further comprising intake air amount-detecting means (air flow sensor 20) disposed in the intake passage 6 at a location upstream of the intake throttle valve, for outputting a detection signal indicative of an intake air amount GAIR which is an amount of air flowing through the intake passage 6, upstream-side pressure-detecting means (atmospheric pressure sensor 24) for outputting a detection signal indicative of the upstream-side pressure (atmospheric pressure PA), downstream-side pressure-detecting means (intake pressure sensor 22) for outputting a detection signal indicative of the downstream-side pressure (intake pressure PBA), pressure ratio-calculating means (ECU 2) for calculating a pressure ratio R_P which is a ratio between the downstream-side pressure and the upstream-side pressure, based on results of detection by the upstream-side pressure-detecting means and the downstream-side pressure-detecting means, and valve opening-detecting means (ECU 2, throttle valve opening sensor 21) for detecting a valve opening degree (throttle valve opening TH) as the degree of opening of the intake throttle valve, and wherein the basic intake parameter-calculating means includes basic intake air amount-calculating means (ECU 2, step 90) for calculating a basic intake air amount GAIRN which is a basic value of the intake air amount GAIR, as the basic intake parameter, based on a result of detection by the intake air amount-detecting means, wherein the correction value-calculating means further includes second correction value-calculating means (ECU 2, steps 100 to 107) for calculating a second correction value (correction coefficient KAFMERR) for correcting the basic intake air amount GAIRN, as the correction value, when the detected valve opening degree is not smaller than a predetermined valve opening degree THB and at the same time the calculated pressure ratio R_P is smaller than a critical pressure ratio R_CRIT, wherein the intake parameter-calculating means includes intake air amount-calculating means (ECU 2, step 91) for calculating the intake air amount GAIR, as the intake parameter, by correcting the basic intake air amount GAIRN using the calculated second correction value (correction coefficient KAFMERR), and wherein the first opening function value-calculating means calculates the first opening function value by using the intake air amount as the passing air amount GAIR.

According to this intake parameter-calculating device, it is possible to obtain the same advantageous effects as provided by the invention as claimed in claim 11.

The invention as claimed in claim 15 is the intake parameter-calculating device as claimed in claim 14, wherein the basic intake parameter-calculating means further includes basic downstream-side pressure-calculating means (ECU 2, step 110) for calculating a basic downstream-side pressure (basic intake pressure PBAN) which is a basic value of the downstream-side pressure, as the basic intake parameter, based on a result of detection by the downstream-side pressure-detecting means, when the pressure ratio R_P is not smaller than the critical pressure ratio R_CRIT, wherein the correction value-calculating means (ECU 2, steps 120 to 131) further includes third correction value-calculating means for calculating a third correction value (correction term PBAERRCOR) for correcting the basic downstream-side pressure, as the correction value, when the pressure ratio R_P is not smaller than the critical pressure ratio R_CRIT, and wherein the intake parameter-calculating means further includes downstream-side pressure-calculating means (ECU 2, step 111) for calculating the downstream-side pressure (intake pressure PBA), as the intake parameter, by correcting the basic downstream-side pressure (basic intake pressure PBAN) using the calculated third correction value (correction term PBAERRCOR), when the pressure ratio R_P is not smaller than the critical pressure ratio R_CRIT.

According to this intake parameter-calculating device, it is possible to obtain the same advantageous effects as provided by the invention as claimed in claims 12 and 13.

The invention as claimed in claim 16 is the intake parameter-calculating device as claimed in claim 1, further comprising upstream-side pressure-detecting means (atmospheric pressure sensor 24) for outputting a detection signal indicative of the upstream-side pressure (atmospheric pressure PA), upstream-side pressure-calculating means (ECU 2) for calculating the upstream-side pressure (atmospheric pressure PA) based on a result of detection by the upstream-side pressure-detecting means, downstream-side pressure-detecting means (intake pressure sensor 22) for outputting a detection signal indicative of the downstream-side pressure (intake pressure PBA), and pressure ratio-calculating means (ECU 2) for calculating a pressure ratio R_P which is a ratio between the downstream-side pressure and the upstream-side pressure, based on results of detection by the upstream-side pressure-detecting means and the downstream-side pressure-detecting means, and wherein the basic intake parameter-calculating means further includes basic downstream-side pressure-calculating means (ECU 2, step 110) for calculating a basic downstream-side pressure (basic intake pressure PBAN) which is a basic value of the downstream-side pressure, as the basic intake parameter, based on a result of detection by the downstream-side pressure-detecting means, when the calculated pressure ratio R_P is not smaller than a critical pressure ratio R_CRIT, wherein the correction value-calculating means further includes third correction value-calculating means (ECU 2 steps 120 to 131) for calculating a third correction value (correction term PBAERRCOR) for correcting the basic downstream-side pressure, as the correction value, when the pressure ratio R_P is not smaller than a critical pressure ratio R_CRIT, and wherein the intake parameter-calculating means further includes downstream-side pressure-calculating means (ECU 2, step 111) for calculating the downstream-side pressure (intake pressure PBA), as the intake parameter, by correcting the basic downstream-side pressure (basic intake pressure PBAN) using the calculated third correction value (correction term PBAERRCOR), when the pressure ratio R_P is not smaller than the critical pressure ratio R_CRIT.

According to this intake parameter-calculating device, it is possible to obtain the same advantageous effects as provided by the invention as claimed in claims 12, 13 and 15.

The invention as claimed in claim 17 is an intake parameter-calculating method for an internal combustion engine 3, for calculating an intake parameter (passing air amount GAIRTH, intake air amount GAIR, intake pressure PBA) indicative of a state of air in an intake passage 6 in the engine 3 in which an amount of air passing through an intake throttle valve (throttle valve 7*a*) is changed, as a passing air amount, by the intake throttle valve disposed in the intake passage 6, comprising calculating a basic intake parameter (basic passing air amount GAIRTHN, basic intake air amount GAIRN, basic intake pressure PBAN) as a basic value of the intake parameter (step 6, 90, 110, 144, 175), calculating a first opening function value (model equation value KTHCAL) as a first calculated value of an opening function value, using a model equation [equations (7), (13), (23)] derived by a predetermined modeling method and defining a relationship between an upstream-side pressure (atmospheric pressure PA) which is a pressure in the intake passage 6 on an upstream side of the intake throttle valve, a downstream-side pressure (intake pressure PBA) which is a pressure in the intake passage 6 on a downstream side of the intake throttle valve, the opening function value KTH determined by a degree of opening of the intake throttle valve, and the passing air amount GAIRTH (steps 11, 103, 123, 154, 183), calculating a second opening function value (map value KTH) as a second calculated value of the opening function value, using a correlation model (FIG. 2) representative of a correlation between the degree of opening of the intake throttle valve (throttle valve opening TH) and the opening function value KTH (steps 11, 100, 120, 151, 180), calculating a correction value (correction coefficient KTHCOR, correction coefficient KAFMERR, correction term PBAERRCOR) using a function value ratio (function value error KTHERR) which is a ratio between one and the other of the calculated first opening function value and the calculated second opening function value (steps 3, 100 to 107, 120 to 131, 142, 146, 147, 172), and calculating the intake parameter (passing air amount GAIRTH, intake air amount GAIR, intake pressure PBA) by correcting the basic intake parameter using the calculated correction value (steps 6, 91, 111, 144, 175).

According to this intake parameter-calculating method for an internal combustion engine, it is possible to obtain the same advantageous effects as provided by the invention as claimed in claim 1.

BRIEF DESCRIPTION OF DRAWINGS

FIG. 25 A diagram showing an example of a map for use in calculating an error KTHERRCOR.

MODE FOR CARRYING OUT INVENTION

Figure 1:
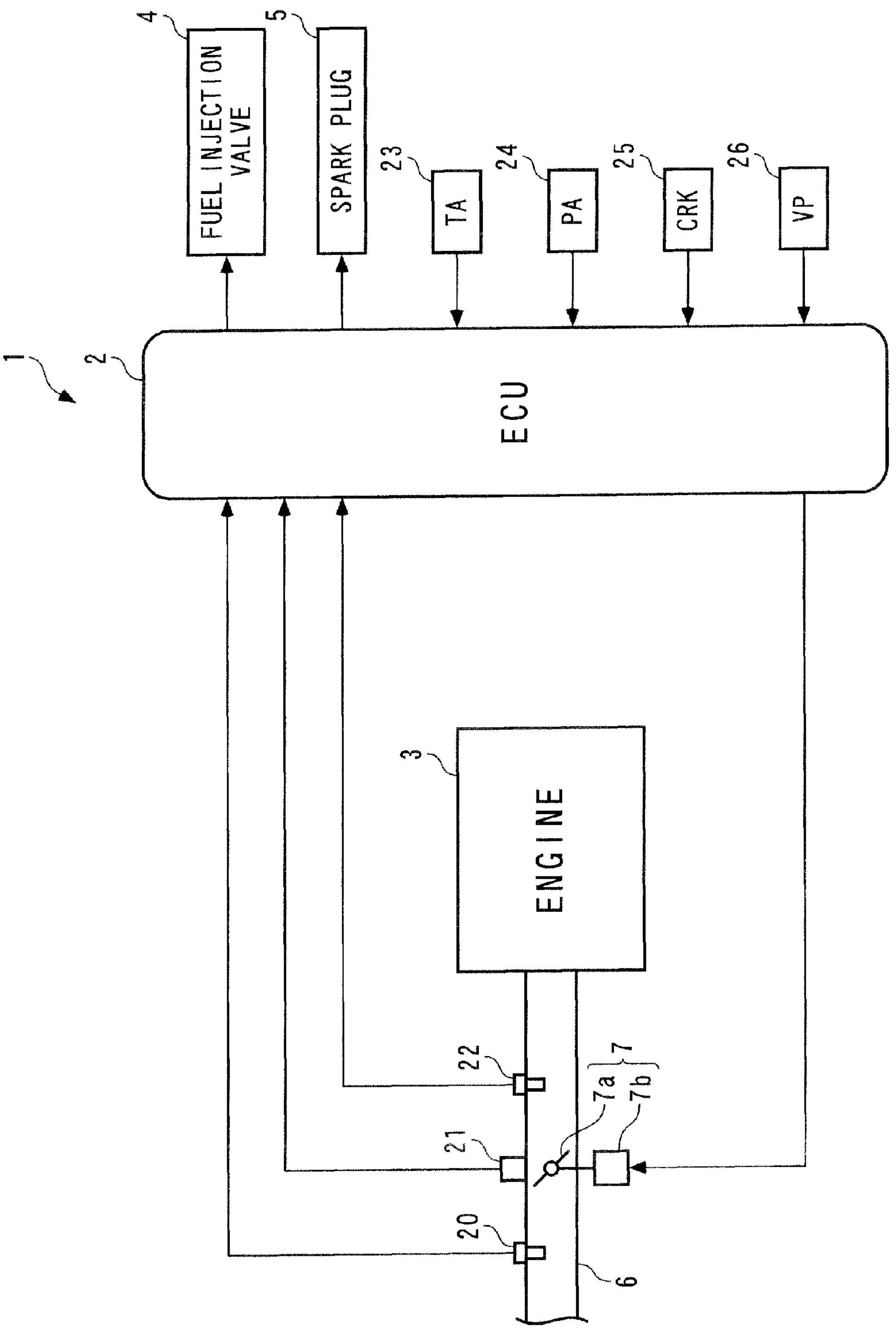
FIG. 1 A schematic diagram of an intake parameter-calculating device according to a first embodiment of the present invention and an internal combustion engine to which the intake parameter-calculating device is applied.

Hereafter, an intake parameter-calculating device for an internal combustion engine according to a first embodiment of the present invention will be described with reference to drawings. As shown in FIG. 1, the intake parameter-calculating device 1 according to the first embodiment includes an ECU 2, and, as will be described hereinafter, the ECU 2 calculates a passing air amount GAIRTH, an intake air amount GAIR, and an intake pressure PBA, as intake parameters.

The engine 3 is a gasoline engine installed on a vehicle, not shown, and includes fuel injection valves 4 and spark plugs 5 provided for respective cylinders. Each fuel injection valve 4 is electrically connected to the ECU 2, and a valve-opening time period and a valve-opening timing thereof are controlled by the ECU 2, whereby fuel injection control is performed.

Further, each spark plug 5 as well is electrically connected to the ECU 2, and a state of spark discharge is controlled by the ECU 2 such that a mixture in a combustion chamber is burned in timing corresponding to ignition timing. That is, ignition timing control is executed.

An air flow sensor 20, a throttle valve mechanism 7, a throttle valve opening sensor 21, and an intake pressure sensor 22 are provided at respective locations of an intake passage 6 of the engine 3 from upstream to downstream in the mentioned order. The air flow sensor 20 detects a flow rate of air passing through the vicinity of the air flow sensor 20 in the intake passage 6 (hereinafter referred to as the "intake air amount"), and delivers a signal indicative thereof to the ECU 2. As described hereinafter, the ECU 2 calculates the intake air amount GAIR based on the detection signal from the air flow sensor 20. The intake air amount GAIR is calculated as a mass flow rate. Note that in the present embodiment, the air flow sensor 20 corresponds to intake air amount-detecting means.

The throttle valve mechanism 7 includes a throttle valve 7*a*, and a TH actuator 7*b* that actuates the throttle valve 7*a* to open and close the same. The throttle valve 7*a* is pivotally disposed in an intermediate portion of the intake passage 6 such that the degree of opening thereof is changed by the pivotal motion thereof to thereby change the amount of air passing through the throttle valve 7*a*. The TH actuator 7*b* is a combination of a motor (not shown) connected to the ECU 2, and a gear mechanism (not shown), and is controlled by a control signal input from the ECU 2, to thereby change the degree of opening of the throttle valve 7*a*.

Further, the throttle valve opening sensor 21, which is implemented e.g. by a potentiometer, detects the degree of opening of the throttle valve 7*a* (hereinafter referred to as the "throttle valve opening") TH, and delivers a signal indicative of the detected throttle valve opening TH to the ECU 2. The ECU 2 calculates the throttle valve opening TH based on the detection signal from the throttle valve opening sensor 21. The throttle valve opening TH is calculated as an angle (°). Note that in the present embodiment, the throttle valve 7*a* corresponds to an intake throttle valve, the throttle valve opening TH corresponds to a valve opening degree, and the throttle valve opening sensor 21 corresponds to valve opening-detecting means.

Furthermore, the intake pressure sensor 22 is inserted into a surge tank portion of the intake passage 6 at a location downstream of the throttle valve 7*a*, and detects a pressure within the intake passage 6 (hereinafter referred to as the "intake pressure"), to deliver a signal indicative of the detected intake pressure to the ECU 2. The ECU 2 calculates the intake pressure PBA based on the detection signal output from the intake pressure sensor 22. The intake pressure PBA is calculated as an absolute pressure. Note that in the present embodiment, the intake pressure sensor 22 corresponds to downstream-side pressure-detecting means, and the intake pressure PBA corresponds to a downstream-side pressure.

On the other hand, an intake air temperature sensor 23, an atmospheric pressure sensor 24, a crank angle sensor 25, and four wheel speed sensors 26 (only one of which is shown) are electrically connected to the ECU 2, respectively. The intake air temperature sensor 23 and the atmospheric pressure sensor 24 detect the temperature of air within the intake passage 6 (hereinafter referred to as the "intake air temperature") and the pressure of atmospheric air (hereinafter referred to as the "atmospheric pressure"), respectively, and deliver respective signals indicative of the detected intake air temperature and atmospheric pressure to the ECU 2.

The ECU 2 calculates the intake air temperature TA and the atmospheric pressure PA based on the detection signals from the intake air temperature sensor 23 and the atmospheric pressure sensor 24, respectively. The intake air temperature TA and the atmospheric pressure PA are calculated as an absolute temperature and an absolute pressure, respectively. Note that in the present embodiment, the atmospheric pressure sensor 24 corresponds to upstream-side pressure-detecting means, and the atmospheric pressure PA corresponds to an upstream-side pressure.

Further, the crank angle sensor 25 is constituted by a magnet rotor and an MRE pickup, and delivers a CRK signal and a TDC signal, which are both pulse signals, to the ECU 2 along with rotation of a crankshaft (not shown). Each pulse of the CRK signal is generated whenever the crankshaft rotates through a predetermined crank angle (e.g. 2°). The ECU 2 calculates the rotational speed of the engine 3 (hereinafter referred to as "the engine speed") NE based on the CRK signal. Further, the TDC signal indicates that a piston in one of the cylinders is in a predetermined crank angle position slightly before the TDC position of the intake stroke, and each pulse thereof is delivered whenever the crankshaft rotates through a predetermined crank angle.

Furthermore, each of the four wheel speed sensors 26 detects the rotational speed of associated one of the wheels, and delivers a signal indicative of the detected rotational speed to the ECU 2. The ECU 2 calculates a vehicle speed VP and the total travelled distance DIST of the vehicle after the start of the engine 3 based on the detection signals from the wheel speed sensors 26.

On the other hand, the ECU 2 is implemented by a microcomputer comprising a CPU, a RAM, a ROM, and an I/O interface (none of which are specifically shown), and calculates operating condition parameters, such as the engine speed NE, indicative of the operating conditions of the engine 3, based on the detection signals from the aforementioned sensors 20 to 26. Further, as described hereinafter, the ECU 2 executes various calculation processes, such as a process for calculating the passing air amount GAIRTH, a process for calculating the intake air amount GAIR, and a process for calculating the intake pressure PBA.

Note that in the present embodiment, the ECU 2 corresponds to basic intake parameter-calculating means, first opening function value-calculating means, second opening function value-calculating means, correction value-calculating means, intake parameter-calculating means, basic passing air amount-calculating means, first correction value-calculating means, passing air amount-calculating means, onboard identification means, estimated upstream-side pressure-calculating means, downstream-side pressure-detecting means, pressure ratio-calculating means, valve opening-detecting means, basic intake air amount-calculating means, second correction value-calculating means, intake air amount-calculating means, basic downstream-side pressure-calculating means, third correction value-calculating means, and downstream-side pressure-calculating means.

Hereinafter, a description will be given of the principle of a method of calculating the passing air amount GAIRTH in the present embodiment. In the case of the engine 3 according to the present embodiment, the throttle valve 7*a* is disposed in the intake passage 6, and hence if the engine 3 is modeled by regarding air passing through the throttle valve 7*a* (hereinafter referred to as "passing air") as compressible fluid and, at the same time, adiabatic flow, and at the same time regarding the throttle valve 7*a* as a nozzle, there is obtained a modeling equation expressed by the following equation (1):

$$u=\sqrt{\frac{2\kappa}{\kappa-1}\cdot\frac{P_1}{\rho_1}\cdot\left\{1-\left(\frac{P_2}{P_1}\right)^{\frac{\kappa-1}{\kappa}}\right\}} \tag{1}$$

In the above equation (1), u represents the flow velocity of passing air, $P_1$ and $P_2$ represent pressures on the upstream side and downstream side of the throttle valve 7*a*, respectively, ρ1 represents the density of intake air on the upstream side of the throttle valve 7*a*, and κ represents a specific heat ratio.

Next, the flow rate of passing air is represented by G, the opening area of the throttle valve 7*a* by Ath, the flow rate coefficient of the throttle valve 7*a* by Cd, the temperature of air by T, and the gas constant of air by R, and the equation of continuity and the equation of state of gas are applied to the above equation (1) to change the equation (1), whereby there is obtained the following equation (2):

$$G=Cd\cdot Ath\cdot P_1\cdot\sqrt{\frac{1}{R\cdot T}}\cdot\sqrt{\frac{2\kappa}{\kappa-1}\cdot\left\{\left(\frac{P_2}{P_1}\right)^{\frac{2}{\kappa}}-\left(\frac{P_2}{P_1}\right)^{\frac{\kappa+1}{\kappa}}\right\}} \tag{2}$$

Here, when the term of a pressure ratio $P_2/P_1$ in the above equation (2) is defined as a flow rate function value Ψ as expressed by the following equation (3), and the above equation (2) is rewritten using the equation (3), there is obtained the following equation (4):

$$\Psi=\sqrt{\frac{2\kappa}{\kappa-1}\cdot\left\{\left(\frac{P_2}{P_1}\right)^{\frac{2}{\kappa}}-\left(\frac{P_2}{P_1}\right)^{\frac{\kappa+1}{\kappa}}\right\}} \tag{3}$$

$$G=Cd\cdot Ath\cdot P_1\cdot\sqrt{\frac{1}{R\cdot T}}\cdot\Psi \tag{4}$$

In the above equation (4), both the opening area Ath and the flow rate coefficient Cd are functions determined by the throttle valve opening TH, and therefore when a value Cd·Ath is defined as an opening function value KTH (=Cd·Ath), and the above equation (4) is rewritten using KTH, there is obtained the following equation (5):

$$G=\frac{KTH\cdot P_1\cdot\Psi}{\sqrt{R\cdot T}} \tag{5}$$

In the above equation (5), when the upstream-side pressure $P_1$ is replaced by the atmospheric pressure PA by ignoring pressure loss on the upstream side of the throttle valve 7*a*, the flow rate G by the passing air amount GAIRTH, and temperature T by the intake air temperature TA, and the flow rate function value Ψ is represented by FPBAPA, the square root of a gas constant R by RGAS ($=R^{1/2}$), and the square root of the intake air temperature TA by RTTA ($=TA^{1/2}$), there is obtained a modeling equation expressed by the following equation (6). Note that KC in the following equation (6) represents a conversion coefficient for converting the units of the passing air amount GAIRTH to (g/sec).

$$GAIRTH = \frac{KC \cdot KTH \cdot PA \cdot FPBAPA}{RGAS \cdot RTTA} \quad (6)$$

In the above equation (6), the flow rate function value FPBAPA is determined by a pressure ratio R_P (=PBA/PA), which is a ratio between the intake pressure PBA and the atmospheric pressure PA, and therefore is calculated by searching a map according to the pressure ratio R_P, as described hereinafter. Further, when the above equation (6) is rearranged with respect to KTH, and the passing air amount GAIRTH is replaced by the intake air amount GAIR, there is obtained the following equation (7):

$$KTH = \frac{GAIR \cdot RGAS \cdot RTTA}{KC \cdot FPBAPA \cdot PA} \quad (7)$$

Figure 2:
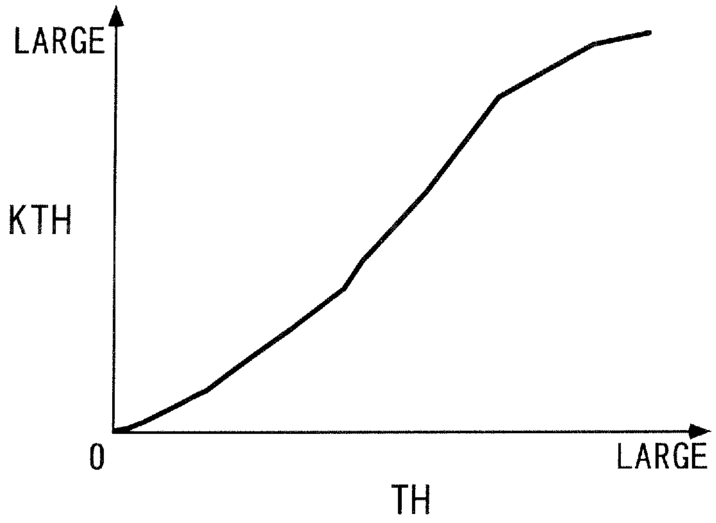
FIG. 2 A view showing an example of a map for use in calculating an opening function value KTH.

Here, the opening function value KTH is determined by the throttle valve opening TH, and in a case where the map is formed by measuring the actual relationship between the opening function value KTH and the throttle valve opening TH (i.e. in a case where identification is performed offline), a map shown in FIG. 2 is obtained. If the opening function value calculated by the aforementioned equation (7) is represented by a model equation value KTHCAL, the opening function value calculated by searching the map shown in FIG. 2 is represented by a map value KTH, and further a ratio between the model equation value KTHCAL and the map value KTH is represented by a value KTHERR (=KTHCAL/KTH), when KTHERR=1, KTH=KTHCAL holds, which shows that there is no modeling error in the model equation (6). On the other hand, in a case where the value KTHERR deviates from 1, as the degree of deviation of KTHERR from 1 is larger, the degree of deviation of the model equation value KTHCAL from the map value KTH becomes larger, which shows that a modeling error in the aforementioned model equation (6) becomes larger.

As described above, the value KTHERR represents the modeling error in the model equation (6), and in the following description, the value KTHERR is referred to as the "function value error KTHERR". Note that in the present embodiment, the FIG. 2 map corresponds to a correlation model, the model equation value KTHCAL to a first opening function value, the map value KTH to a second opening function value, and the function value error KTHERR to a function value ratio.

The function value error KTHERR is mainly caused by deviation of the opening area of the throttle valve 7*a* from that of a standard quality product (reference quality product). This deviation is a deviation of an actual product from the map value KTH set based on the standard throttle valve, and is caused e.g. by a variation in the accuracy of a throttle bore diameter or foreign matter attached to a throttle bore, such as carbon. In the following description, the deviation is referred to as the "first error". Further, since the detection signals from the air flow sensor 20 and the intake pressure sensor 22 are used for calculation of the function value error KTHERR, the function value error KTHERR is also caused by the detection error of the air flow sensor 20 (hereinafter referred to as the "second error") or by the detection error of the intake pressure sensor 22 (hereinafter referred to as the "third error").

In the case of the first error, as the throttle valve opening TH becomes larger (i.e. the opening area of the throttle valve 7*a* becomes larger), the influence of the throttle valve opening TH on the function value error KTHERR becomes smaller, and hence it is possible to ignore the first error in a region where the throttle valve opening TH becomes equal to or larger than a predetermined opening THB. Note that it is possible to empirically determine the predetermined opening THB or calculate the same based on an allowable error of the opening area of the throttle valve 7*a*. Further, when the pressure ratio R_P is lower than a critical pressure ratio R_CRIT, the flow rate function value FPBAPA is constant, and hence in a region of R_P<R_CRIT, the function value error KTHERR ceases to be affected by the detection error of the intake pressure sensor 22. Therefore, when the throttle valve opening TH which makes the pressure ratio R_P equal to the critical pressure ratio R_CRIT is represented by TH_CRIT, the third error can be ignored in a region of TH<TH_CRIT (i.e. R_P<R_CRIT). As a consequence, in a region of THB≤TH<TH_CRIT (i.e. a region where THB≤TH and at the same time R_P<R_CRIT hold), the first and third errors can be ignored, so that it is possible to identify the second error using the function value error KTHERR.

For the above reason, in the present embodiment, as will be described hereinafter, in a region of TH<THB, to compensate for (correct) the first error, a correction coefficient KTHCOR for correcting a basic passing air amount GAIRTHN is calculated using the function value error KTHERR; in a region of THB≤TH and at the same time R_P<R_CRIT, to compensate for the second error, a correction coefficient KAFMERR for correcting a basic intake air amount GAIRN is calculated using the function value error KTHERR; and in a region of TH_CRIT≤TH (i.e. a region of R_CRIT≤R_P), to compensate for the third error, a correction term PBAERRCOR for correcting a basic intake pressure PBAN is calculated using the function value error KTHERR.

Hereinafter, a description will be given of a method of calculating the passing air amount GAIRTH while compensating for the above-described first error. First, it is assumed that a value obtained by subtracting 1 from the function value error KTHERR is represented by an error KTHERRCOR (=KTHERR−1). In this case, as described hereinabove, since the degree of deviation of the function value error KTHERR from 1 represents the modeling error, the error KTHERRCOR represents the modeling error, and accordingly, an error model equation is defined as expressed by the following equation (8). Note that the reason for using the error model equation (8) will be described hereinafter.

$$KTHERRCOR = A \cdot (TH - THB)^2 \quad (8)$$

In the error model equation (8), A represents a model parameter, and when the least-squares method is used as a method of calculation for onboard identification of the model parameter A, the following equation (9) is obtained as an identifying calculation equation for identifying the model parameter A.

$$A = \frac{\sum \{KTHERRCOR \cdot (TH - THB)^2\}}{\sum (TH - THB)^4} \quad (9)$$

Note that as will be described hereinafter, in an actual calculation of the model parameter A, a method is used which makes it possible, based on the above equation (9), to avoid lowering of the calculation accuracy in the identification result of the model parameter A even when a sampling region of the throttle valve opening TH is biased.

Next, the error KTHERRCOR is calculated using the identified model parameter A by the above-mentioned equation (8), and then the error-dependent correction coefficient KTHCOR is calculated using the following equation (10):

$$KTHCOR = \frac{1}{KTHERRCOR + 1} \quad (10)$$

As expressed by the above equation (10), the error-dependent correction coefficient KTHCOR is calculated as the sum of the error KTHERRCOR and 1, that is, a value corresponding to the reciprocal of the function value error KTHERR. This is for the following reason: Since the function value error KTHERR is the ratio between the model equation value KTHCAL and the map value KTH, when KTHERR>1 holds, in other words, when the model equation value KTHCAL is larger than the map value KTH, to correct the model equation value KTHCAL by an amount which is larger than the map value KTCH, it is only required to divide the passing air amount GAIRTH by the function value error KTHERR. On the other hand, when KTHERR<1 holds, i.e. when the model equation value KTHCAL is smaller than the map value KTH, to correct the model equation value KTHCAL by an amount which is smaller than the map value KTH, it is only required to divide the passing air amount GAIRTH by the function value error KTHERR. However, the error-dependent correction coefficient KTHCOR is used as a multiplication coefficient, as described hereinafter, and hence to correct the model equation value KTHCAL by an amount which is larger or smaller than the map value KTH, the error-dependent correction coefficient KTHCOR is calculated as a value corresponding to the reciprocal of the function value error KTHERR.

Then, finally, the passing air amount GAIRTH is calculated using the error-dependent correction coefficient KTHCOR by the following equations (11) and (12):

$$GAIRTHN = \frac{KC \cdot KTH \cdot HPA \cdot FPBAPA}{RGAS \cdot RTTA} \quad (11)$$

$$GAIRTH = GAIRTHN \cdot KTHCOR \quad (12)$$

In the above equation (11), GAIRTHN represents the basic passing air amount, and HPA represents an estimated atmospheric pressure calculated, as described hereinafter. The equation (11) corresponds to an equation obtained by replacing the passing air amount GAIRTH and the atmospheric pressure PA in the aforementioned equation (7) with the basic passing air amount GAIRTHN and the estimated atmospheric pressure HPA, respectively. In the equation (11), the estimated atmospheric pressure HPA is used in place of the atmospheric pressure PA in order to improve the calculation accuracy of the passing air amount GAIRTH while avoiding a fluctuation in the atmospheric pressure PA. As expressed by the above equation (12), the passing air amount GAIRTH is calculated by correcting the basic passing air amount GAIRTHN by the correction coefficient KTHCOR. Note that in the present embodiment, the basic passing air amount GAIRTHN corresponds to a basic intake parameter, and the correction coefficient KTHCOR corresponds to a correction value and a first correction value.

Next, a description will be given of the reason for using the aforementioned error model equation (8). First, as described hereinabove, the opening function value KTH is the product of the opening area Ath and the flow rate coefficient Cd, and has a high correlation with the square of the radius of the throttle valve 7*a*. Therefore, it is possible to obtain more excellent calculation accuracy when a quadratic equation in which an error is set as a dependent variable and the throttle valve opening TH is set as an independent variable is used as an error model equation. In this case, in the region of THB≤TH, the function value error KTHERR is caused not by an error in the calculation of the throttle valve opening TH but by an error in the calculation of the intake air amount GAIR or the intake pressure PBA, as described above, and hence under the condition that there is no error in the calculation of the intake air amount GAIR or the intake pressure PBA, the function value error KTHERR=1 holds, as shown in FIG. 3, which makes it unnecessary to identify the model parameter A of the error model equation.

Figure 3:
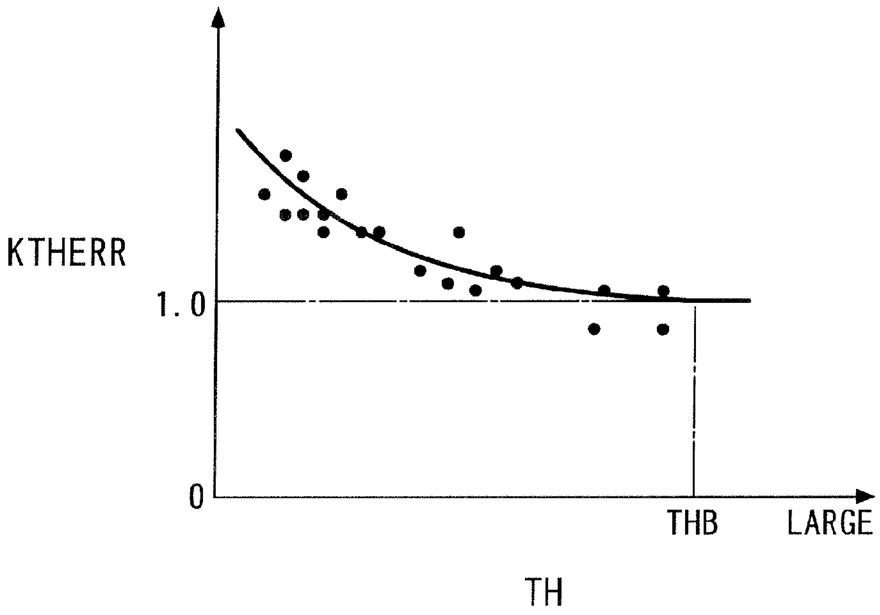
FIG. 3 A view showing an example of results of calculation in the case where a quadratic equation defining the relationship between a function value error KTHERR and a throttle valve opening TH is used as an error model equation.

In addition to this, as shown in FIG. 3, when a quadratic equation in which the function value error KTHERR is set as a dependent variable Y and the throttle valve opening TH is set as an independent variable X is used as an error model equation, the error model equation is in the form of $Y=a\cdot X^2+b\cdot X+c$ (a, b, and c represent model parameters), which makes it necessary to identify the three model parameters a, b, and c. As a result, the identifying calculation becomes complicated to increase computational load. Note that black circles in FIG. 3 each indicate a calculation result in each associated timing for controlling the function value error KTHERR.

Figure 4:
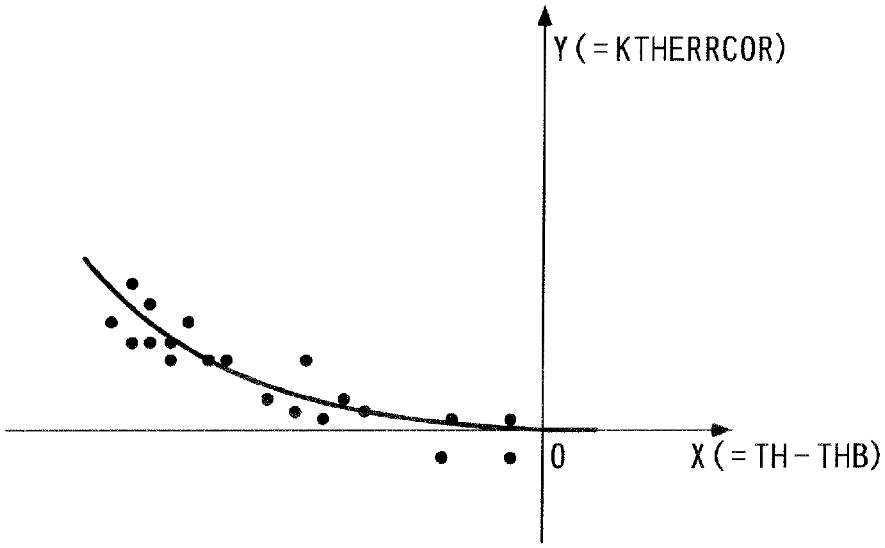
FIG. 4 A view showing an example of results of calculation in the case where the error model equation according to the first embodiment is used.

On the other hand, in the case where the above-mentioned equation (8) is used, when the error KTHERRCOR is set as the dependent variable Y and TH-THB is set as the independent variable X as shown in FIG. 4, the error model equation is in the form of $Y=A\cdot X^2$. As a consequence, it is only required to identify the single model parameter A alone, whereby it is possible to facilitate the identifying calculation to reduce the computational load. For the above-described reasons, in the present embodiment, the equation (8) is used as an error model equation. Note that black circles in FIG. 4 each indicate a calculation result in associated timing for controlling the error KTHERRCOR.

Hereafter, a process for calculating the passing air amount GAIRTH will be described with reference to FIG. 5. This calculation process calculates the passing air amount GAIRTH by the above-described calculation method, and is executed by the ECU 2 whenever the CRK signal is generated by the ECU 2 a predetermined number of times (i.e. whenever the crankshaft rotates through a predetermined crank angle). Note that it is assumed that in the following description, various calculated values are all stored in the RAM of the ECU 2, and each value read from the RAM in the current control timing, i.e. each value calculated in the immediately preceding control timing is referred to as the "immediately preceding value".

As shown in the figure, first, in a step 1 (shown as S1 in abbreviated form in FIG. 5; the following steps are also shown in abbreviated form), it is determined whether or not the throttle valve opening TH is smaller than a predetermined opening degree THB. If the answer to this question is affirmative (YES), it is judged that it is necessary to correct the passing air amount GAIRTH using the error-dependent correction coefficient KTHCOR, and the process proceeds to a step 2, wherein the error KTHERRCOR is calculated by the aforementioned equation (8).

Then, in a step 3, the error-dependent correction coefficient KTHCOR is calculated by the aforementioned equation (10).

On the other hand, if the answer to the question of the step 1 is negative (NO), it is judged that it is not necessary to correct the passing air amount GAIRTH using the error-dependent correction coefficient KTHCOR, and the process proceeds to a step 4, wherein the error-dependent correction coefficient KTHCOR is set to 1.

Figure 6:
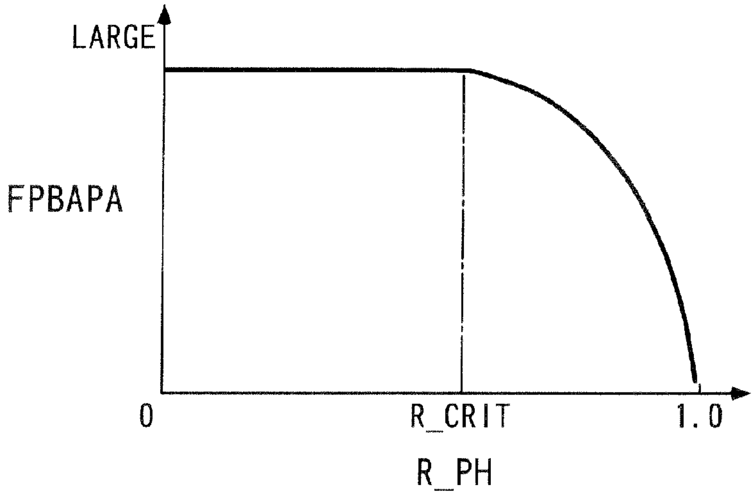
FIG. 6 A diagram showing an example of a map for use in calculating a flow rate function value FPBAPA.

In a step 5 following the step 3 or 4, the flow rate function value FPBAPA is calculated by searching a map shown in FIG. 6 according to a pressure ratio R_PH. The pressure ratio R_PH is a value corresponding to a ratio PBA/HPA between the intake pressure PBA and the above-mentioned estimated atmospheric pressure HPA. In this case, the reason for using the pressure ratio R_PH is the same as the reason for using the estimated atmospheric pressure HPA. A value calculated in an atmospheric pressure estimation process and stored in the RAM is used as the estimated atmospheric pressure HPA.

Next, the process proceeds to a step 6, wherein the passing air amount GAIRTH is calculated by the aforementioned equations (11) and (12). In this case, as the square root RTTA of the intake air temperature TA and the opening function value KTH, values calculated in a model parameter-learning process, described hereinafter, and stored in the RAM are used. As described above, the passing air amount GAIRTH is calculated in the step 6, followed by terminating the present process.

Figure 5:
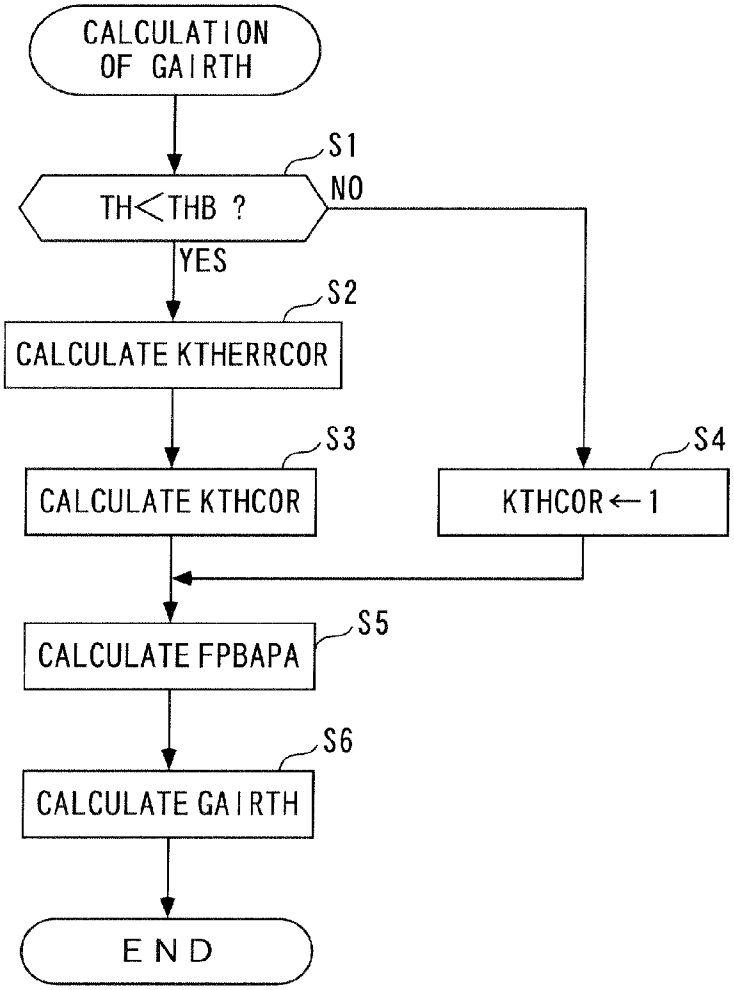
FIG. 5 A flowchart of a process for calculating a passing air amount GAIRTH.

Note that the passing air amount GAIRTH calculated in the calculation process in FIG. 5 is used in various control processes executed by the ECU 2. For example, the passing air amount GAIRTH is used to correct the intake air amount GAIR calculated as described hereinafter, when a fuel injection amount and ignition timing are calculated in a transient operating condition in a fuel injection control process and an ignition timing control process.

Hereafter, the model parameter-learning process will be described with reference to FIG. 7. This process performs calculation for identifying the model parameter A of the error model equation while causing the function value error KTHERR to be reflected thereon, in other words, learns the identified value of the model parameter A, and is executed by the ECU 2 whenever the CRK signal is generated a predetermined number of times.

As shown in the figure, first, in a step 10, it is determined whether or not a learning condition flag F_LEARN is equal to 1. This learning condition flag F_LEARN indicates whether or not conditions for learning the identified value of the model parameter A are satisfied, and the value thereof is set by a method shown in FIG. 8.

Figure 8:
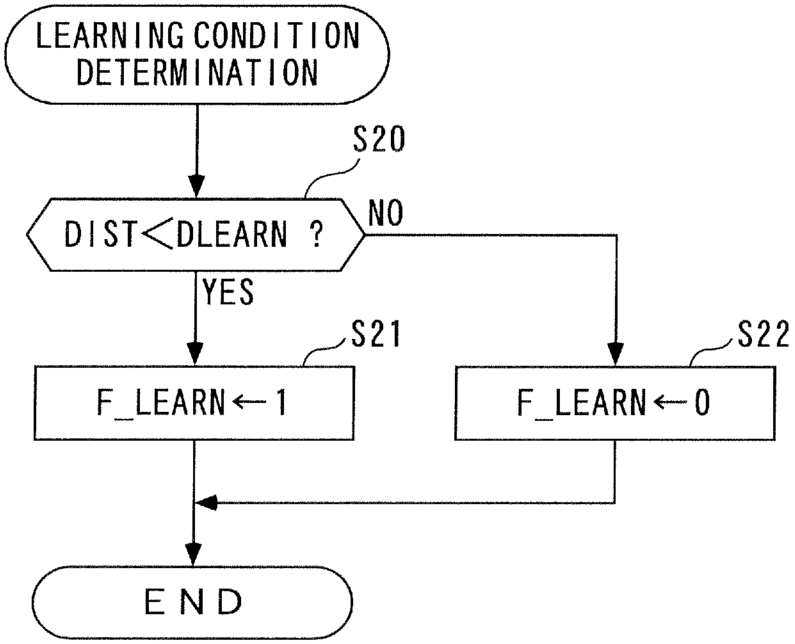
FIG. 8 A flowchart of a learning condition determination process.

Referring to FIG. 8, first, in a step 20, it is determined whether or not the total travelled distance DIST of the vehicle after the start of the engine 3 is smaller than a predetermined value DLEARN. If the answer to this question is affirmative (YES), it is determined that the conditions for learning the identified value of the model parameter A are satisfied, and the process proceeds to a step 21, wherein to indicate the fact, the learning condition flag F_LEARN is set to 1, followed by terminating the present process.

On the other hand, if the answer to the question of the step 20 is negative (NO), it is determined that the conditions for learning the identified value of the model parameter A are not satisfied, and the process proceeds to a step 22, wherein to indicate the fact, the learning condition flag F_LEARN is set to 0, followed by terminating the present process.

Referring again to FIG. 7, if the answer to the question of the step 10 is negative (NO), i.e. if the conditions for learning the identified value of the model parameter A are not satisfied, the present process is immediately terminated, whereas if the answer to the question of the step 10 is affirmative (YES), i.e. if the conditions for learning the identified value of the model parameter A are satisfied, the process proceeds to a step 11, wherein the map value KTH of the opening function value is calculated by searching the above-described map in FIG. 2 according to the throttle valve opening TH.

Then, the process proceeds to a step 12, wherein an identifying value FPBAPAini of the flow rate function value is calculated. The identifying value FPBAPAini is calculated by searching a map obtained by replacing the flow rate function value FPBAPA on the vertical axis in FIG. 6 with the identifying value FPBAPAini and the pressure ratio R_PH on the horizontal axis in FIG. 6 with a pressure ratio R_Phi, according to the pressure ratio R_Phi. The pressure ratio R_Phi is calculated as a ratio PBA/HPAini between the intake pressure PBA and an initial estimated atmospheric pressure HPAini. As the initial estimated atmospheric pressure HPAini, a value calculated in the atmospheric pressure estimation process and stored in the RAM is used. The reason for using the initial estimated atmospheric pressure HPAini will be described hereinafter.

Next, in a step 13, the square root RTTA of the intake air temperature TA is calculated by searching a map, not shown, according to the intake air temperature TA. After that, in a step 14, the model equation value KTHCAL of the opening function value is calculated by the following equation (13):

$$KTHCAL = \frac{GAIR \cdot RGAS \cdot RTTA}{KC \cdot FPBAPAini \cdot HPAini} \tag{13}$$

In this case, the above equation (13) corresponds to an equation obtained by replacing the opening function value KTH, the atmospheric pressure PA, and the flow rate function value FPBAPA in the aforementioned equation (7) with the model equation value KTHCAL, the initial value HPAini of the estimated atmospheric pressure, and the identifying value FPBAPAini of the flow rate function value, respectively. Note that the reason for using these values HPAini and FPBAPAini will be described hereinafter.

In a step 15 following the step 14, the function value error KTHERR is set to the ratio KTHCAL/KTH between the model equation value and the map value.

Then, the process proceeds to a step 16, wherein it is determined whether or not the throttle valve opening TH is smaller than the above-mentioned predetermined opening degree THB. If the answer to this question is negative (NO), the present process is immediately terminated.

On the other hand, if the answer to the question of the step 16 is affirmative (YES), it is determined that the throttle valve opening TH is in a region where a modeling error is caused by the above-described first error, and the calculation for identifying the model parameter A should be performed. Then, the process proceeds to a step 17, wherein a calculation process for identifying the model parameter A is performed, as will be described hereinafter, followed by terminating the present process.

As described above, in the model parameter-learning process, when the learning condition flag F_LEARN=1 holds, the function value error KTHERR is calculated using the initial estimated atmospheric pressure HPAini and the identifying value FPBAPAini of the flow rate function value. The function value error KTHERR is calculated by such a method for the following reason: In the present embodiment, the function value error KTHERR is calculated using an estimated value of the atmospheric pressure PA, and hence if the estimated value of the atmospheric pressure PA contains an error, the compensation accuracy (modification accuracy) of the above-described first to third errors is lowered, which in turn causes lowering of the calculation accuracy (estimation accuracy) of the estimated atmospheric pressure HPA, which is calculated using the three values HGAIRTH, GAIR, and PBA calculated while compensating for the first to third errors, as will be described hereinafter. In this case, to eliminate such influence of an estimation error of the atmospheric pressure PA, it is required to calculate the function value error KTHERR under the condition that the intake pressure PBA calculated based on the detection signal from the intake pressure sensor 22 becomes equal to a true value of the atmospheric pressure PA and at the same time the true value of the atmospheric pressure PA hardly changes. Therefore, to meet the requirement, in the present embodiment, the intake parameter-calculating device 1 is configured to check satisfaction of the learning conditions using the learning condition flag F_LEARN, and calculate the function value error KTHERR using the initial estimated atmospheric pressure HPAini and the identifying value FPBAPAini of the flow rate function value.

Next, the calculation process for identifying the model parameter A will be described with reference to FIG. 9. In this process, as described hereinafter, the region of the throttle valve opening TH is divided into a first region of $0 \leq TH < THN1$, a second region of $THN1 \leq TH < THN2$, a third region of $THN2 \leq TH < THN3$, and a fourth region of $THN3 \leq TH < THB$, and the model parameter A is calculated by a calculation method based on the above-described identifying calculation equation (9) for identifying the model parameter A while performing a uniform weighting process on the above four regions. In this case, THN1 to THN3 represent predetermined opening degrees of the throttle valve opening TH, and are set such that $0 < THN1 < THN2 < THN3 < THB$ holds.

As shown in the figure, first, in a step 40, the error KTHERRCOR is set to a difference KTHERR−1 between the function value error KTHERR and 1. Then, the process proceeds to a step 41, wherein it is determined whether or not the throttle valve opening TH is smaller than the predetermined value THN1. If the answer to this question is affirmative (YES), i.e. if the throttle valve opening TH is within the first region, the process proceeds to a step 44, wherein a region value n is set to 1.

On the other hand, if the answer to the question of the step 41 is negative (NO), i.e. if $THN1 \leq TH$ holds, the process proceeds to a step 42, wherein it is determined whether or not the throttle valve opening TH is smaller than the predetermined value THN2. If the answer to this question is affirmative (YES), i.e. if the throttle valve opening TH is within the second region, the process proceeds to a step 45, wherein the region value n is set to 2.

On the other hand, if the answer to the question of the step 42 is negative (NO), i.e. if $THN2 \leq TH$ holds, the process proceeds to a step 43, wherein it is determined whether or not the throttle valve opening TH is smaller than the predetermined value THN3. If the answer to this question is affirmative (YES), i.e. if the throttle valve opening TH is within the third region, the process proceeds to a step 46, wherein the region value n is set to 3.

On the other hand, if the answer to the question of the step 43 is negative (NO), i.e. if the throttle valve opening TH is within the fourth region, the process proceeds to a step 47, wherein the region value n is set to 4. As described above, the region value n is calculated as a value representing one of the four regions of the throttle valve opening TH.

In a step 48 following one of the above steps 44 to 47, an integral term XXXX[n] of an n-th region is calculated by the following equation (14):

$$XXXX[n] = XXXX[n]z + (TH - THB)^4 \tag{14}$$

In the above equation (14), the integral term XXXX[n] is a value corresponding to a denominator of the above-described identifying calculation equation (9), and XXXX[n]z represents the immediately preceding value of the integral term. Further, a value n in [ ] of the integral term XXXX[n] is the above-mentioned region value. This also applies to the following description. More specifically, in the step 48, for example, when the region value n=1 holds, the integral term XXXX[1] of the first region is calculated, and when the region value n=2 holds, the integral term XXXX[2] of the second region is calculated.

Next, in a step 49, an integral term XXY[n] of the n-th region is calculated by the following equation (15):

$$XXY[n] = XXY[n]z + (TH - THB)^2 \cdot KTHERRCOR \tag{15}$$

In the above equation (15), the integral term XXY[n] is a value corresponding to a numerator of the above-described identifying calculation equation (9), and XXY[n]z represents the immediately preceding value of the integral term.

In a step 50 following the step 49, the number SAMPL[n] of times of the sampling of the n-th region is set to the sum of the immediately preceding value of the number SAMPL[n] and 1 (SAMPL[n]z+1). The number SAMPL[n] represents the number of times of the sampling of the integral term in the n-th region, i.e. the number of calculation results.

Then, the process proceeds to a step 51, wherein a weighted average value XXXXTTL is calculated by the following equation (16):

$$XXXXTTL = \frac{XXXX[1]}{NSAMPL[1]} + \frac{XXXX[2]}{NSAMPL[2]} + \frac{XXXX[3]}{NSAMPL[3]} + \frac{XXXX[4]}{NSAMPL[4]} \tag{16}$$

As is clear from the above equation (16), the weighted average value XXXXTTL is calculated by calculating the arithmetic mean of $(TH-THB)^4$ on a region-by-region basis, and performing weighted average calculation with uniform weighting on these arithmetic mean values.

Next, in a step 52, a weighted average value XXYTTL is calculated by the following equation (17):

$$XXYTTL = \frac{XXY[1]}{NSAMPL[1]} + \frac{XXY[2]}{NSAMPL[2]} + \frac{XXY[3]}{NSAMPL[3]} + \frac{XXY[4]}{NSAMPL[4]} \tag{17}$$

As is apparent when referring to the above equation (17), the weighted average value XXYTTL is calculated by calculating a arithmetic mean value of $KTHERRCOR \cdot (TH-THB)^2$ on a region-by-region basis, and subjects the arithmetic mean values to weighted average calculation with uniform weighting.

In a step 53 following the step 52, the model parameter A is calculated by the following equation (18), followed by terminating the present process.

$$A = \frac{XXYTTL}{XXXXTTL} \tag{18}$$

As described above, in the calculation process for identifying the model parameter A, the weighted average value XXYTTL is calculated by performing the weighted average calculation with uniform weighting on the four arithmetic mean values of the values $KTHERRCOR \cdot (TH-THB)^2$ calculated for the respective regions of the throttle valve opening TH; the weighted average value XXXXTTL is calculated by performing the weighted average calculation with uniform weighting on the four arithmetic mean values of the values $(TH-THB)^4$ calculated for the respective regions of the throttle valve opening TH; and the model parameter A is calculated by dividing the former by the latter. The merit of this calculation method will be described with reference to FIGS. 10 and 11.

Figure 10:
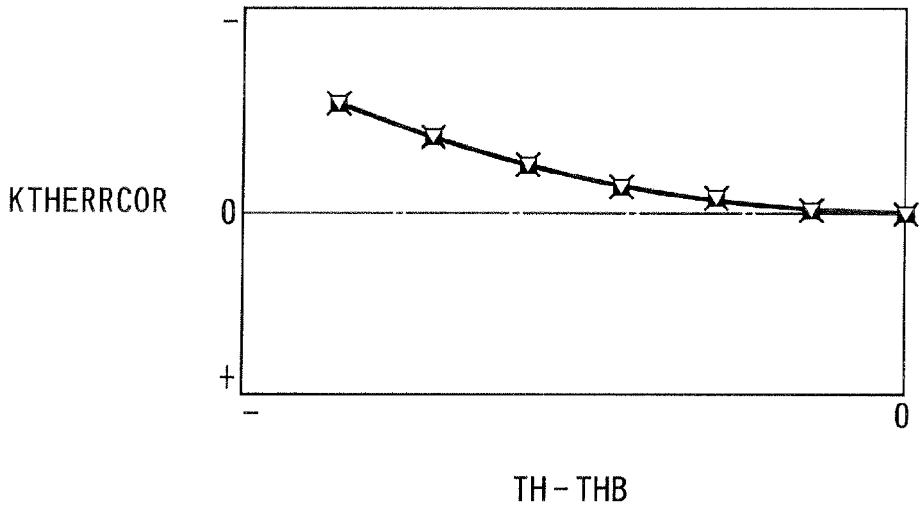
FIG. 10 A diagram showing an example of results of the identifying calculation process performed by the intake parameter-calculating device.
Figure 11:
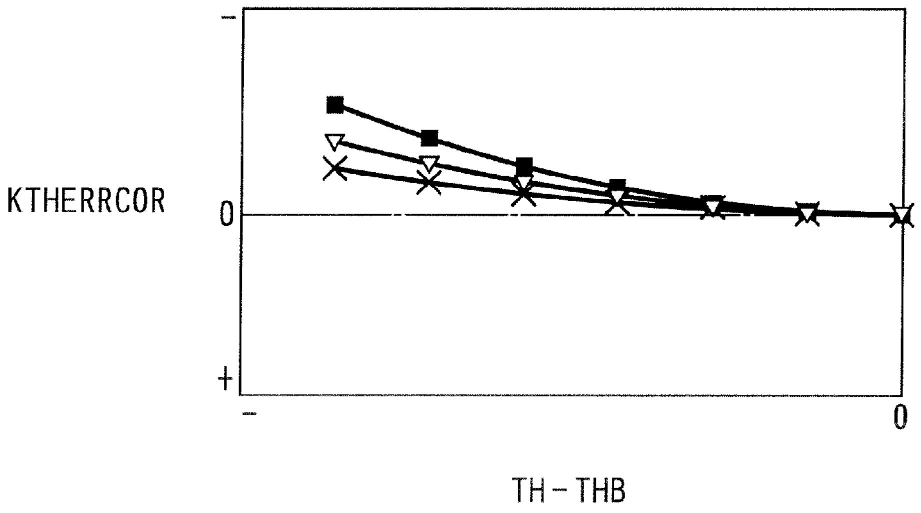
FIG. 11 A diagram showing a comparative example of results of the identifying calculation process.

FIG. 10 shows an example of results of calculation in the case where the error KTHERRCOR is calculated using the model parameter A calculated by the above-described identifying calculation method according to the present embodiment. FIG. 11 shows, for comparison, an example of results of calculation in the case where the error KTHERRCOR is calculated using the model parameter A calculated by the aforementioned equation (9). Note that in FIGS. 10 and 11, data items indicated by ■ are obtained immediately after the start of the computation, data items indicated by ∇ are obtained when longer calculation time has elapsed than the data items indicated by ■, and data items indicated by X are obtained when even longer calculation time has elapsed than the data items indicated by ∇.

As is apparent from the comparison between FIGS. 10 and 11, it is understood that in the FIG. 11 case, the degree of reflection of the results of calculation in a region where a larger number of sampling data items of the throttle valve opening TH are collected, on the results of calculation of the model parameter A, becomes higher with the lapse of the calculation time, so that the curve indicative of the results of calculation of the error KTHERRCOR changes. In short, it is understood that the identification accuracy of the model parameter A is lowered. On the other hand, in the method according to the present embodiment shown in FIG. 10, it is understood that when the calculation time has elapsed, even if sampling data items of the throttle valve opening TH are collected from one particular region in a biased manner, the degree of reflection of the results of calculation in the one particular region on the results of calculation of the model parameter A is made equal to the degree thereof in the other regions by the uniform weighting method described above, and therefore the curve indicative of the results of calculation of the error KTHERRCOR does not change. In short, it is understood that it is possible to ensure high accuracy of the results of calculation for identifying the model parameter A.

Figure 12:
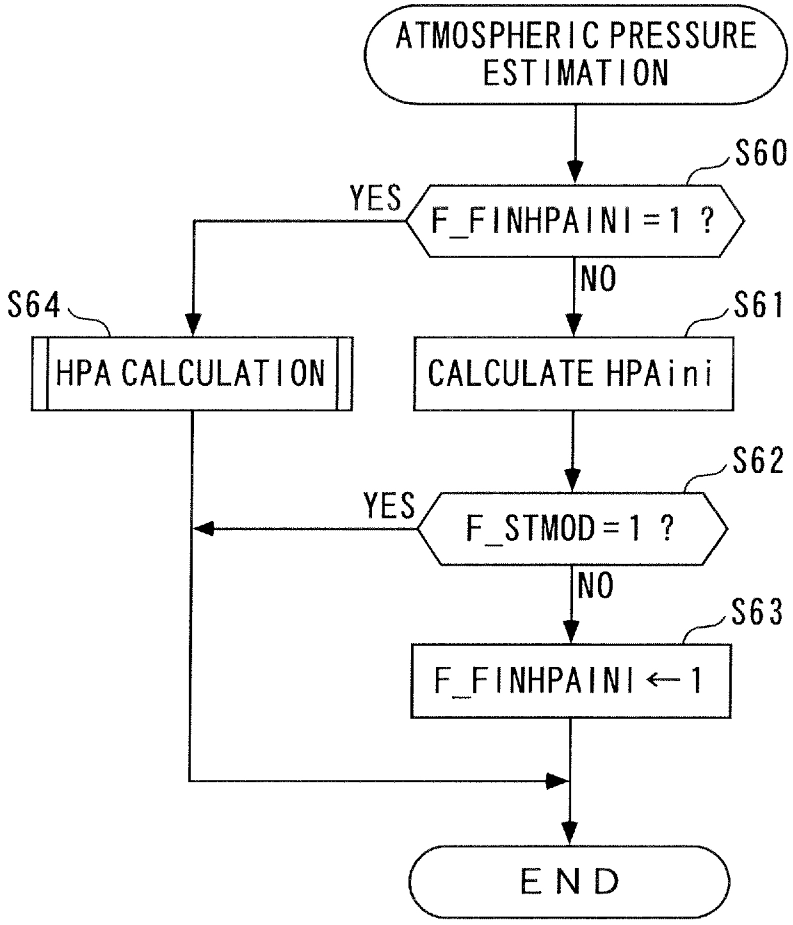
FIG. 12 A flowchart of an atmospheric pressure estimation process.

Next, the atmospheric pressure estimation process will be described with reference to FIG. 12. As will be described hereinafter, this process calculates the estimated atmospheric pressure HPA and the initial estimated atmospheric pressure HPAini, which is an initial value of the estimated atmospheric pressure HPA, and is executed by the ECU 2 whenever the CRK signal is generated a predetermined number of times after the start of cranking of the engine 3. Note that in the present embodiment, the estimated atmospheric pressure HPA corresponds to an estimated upstream-side pressure, and the initial estimated atmospheric pressure HPAini corresponds to a downstream-side pressure detected when the engine 3 is started.

As shown in the figure, first, in a step 60, it is determined whether or not an initial pressure calculated flag F_FINHPAINI is equal to 1. If the answer to this question is negative (NO), the process proceeds to a step 61, wherein the initial estimated atmospheric pressure HPAini is calculated. In the step 61, the immediately preceding value HPAiniz of the initial estimated atmospheric pressure and the intake pressure PBA are compared with each other, and the larger one of them is set as the initial estimated atmospheric pressure HPAini.

Then, the process proceeds to a step 62, wherein it is determined whether or not a start mode flag F_STMOD is equal to 1. This start mode flag F_STMOD is held at 1 until the cranking of the engine 3 is terminated, and is set to 0 when the cranking is terminated. If the answer to this question of the step 62 is affirmative (YES), i.e. if the engine 3 is being cranked, the present process is immediately terminated.

On the other hand, if the answer to the question of the step 62 is negative (NO), i.e. if the cranking is terminated, it is determined that the calculation of the initial estimated atmospheric pressure HPAini should be terminated, the process proceeds to a step 63, wherein to indicate the fact, the initial pressure calculated flag F_FINHPAINI is set to 1, followed by terminating the present process.

As described above, when the initial pressure calculated flag F_FINHPAINI is set to 1 in the step 63, the answer to the question of the above-described step 60 becomes affirmative (YES), and in this case, the process proceeds to a step 64, wherein a process for calculating the estimated atmospheric pressure HPA is executed, as described hereinafter, followed by terminating the present process.

Figure 13:
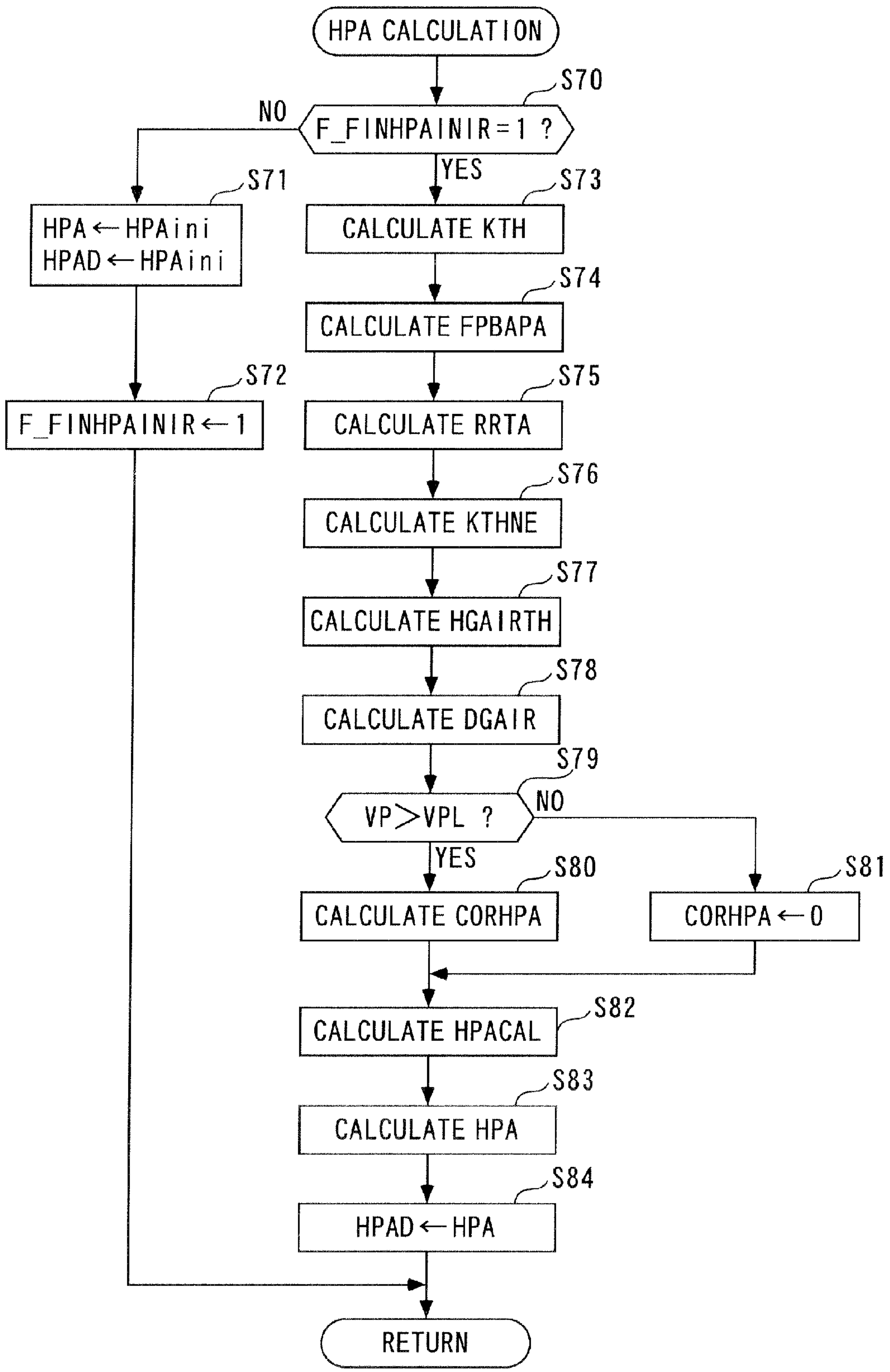
FIG. 13 A flowchart of a process for calculating an estimated atmospheric pressure HPA.

Next, the process for calculating the estimated atmospheric pressure HPA will be described with reference to FIG. 13. As shown in the figure, first, in a step 70, it is determined whether or not an initial setting flag F_FINHPAINIR is equal to 1. When the current loop is first control timing of the present process, the answer to the question of the step 70 is negative (NO), and in this case, the process proceeds to a step 71, wherein the estimated atmospheric pressure HPA and a delayed atmospheric pressure HPAD are both set to the initial estimated atmospheric pressure HPAini.

Then, the process proceeds to a step 72, wherein the initial setting flag F_FINHPAINIR is set to 1, followed by terminating the present process.

Figure 7:
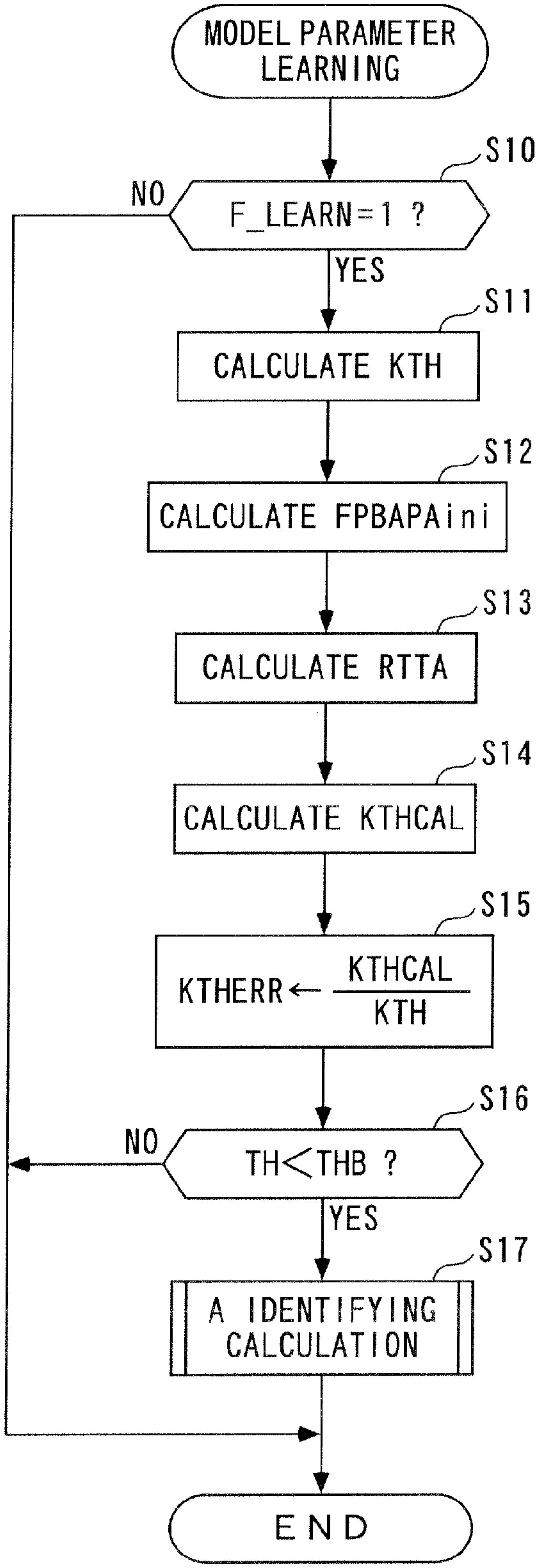
FIG. 7 A flowchart of a model parameter learning process.

As described above, when the initial setting flag F_FINHPAINIR is set to 1 in the step 72, the answer to the question of the above-described step 70 becomes affirmative (YES), and in this case, the process proceeds to a step 73, wherein similarly to the above-described step 11 in FIG. 7, the map value KTH of the opening function value is calculated by searching the above-described map in FIG. 2.

Then, the process proceeds to a step 74, wherein the flow rate function value FPBAPA is calculated. In this step 74, a pressure ratio R_PHD is calculated as a ratio PBA/HPDA between the intake pressure PBA and the above-mentioned delayed estimated atmospheric pressure HPAD, and the flow rate function value FPBAPA is calculated by searching a map obtained by replacing the pressure ratio R_PH on the horizontal axis in the above-described map in FIG. 6 with the pressure ratio R_PHD, according to the pressure ratio R_PHD.

Figure 14:
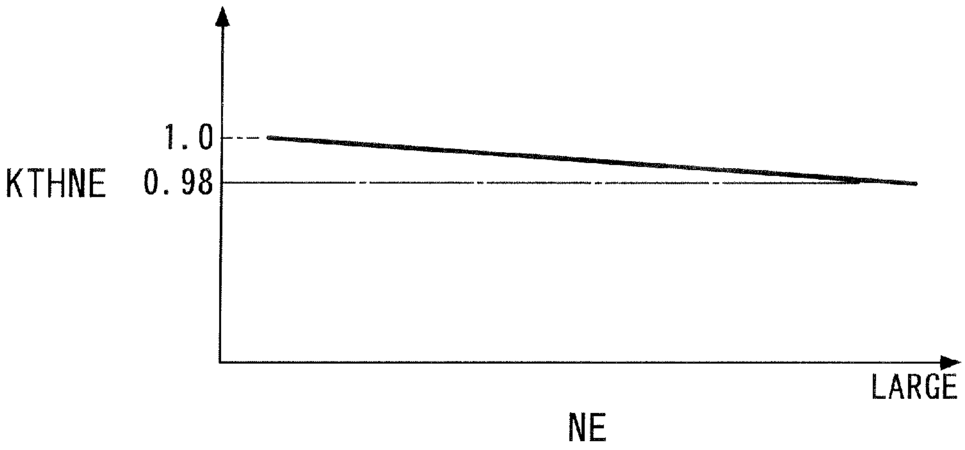
FIG. 14 A diagram showing an example of a map for use in calculating a rotation correction coefficient KTHNE.

Next, the process proceeds to a step 75, wherein similarly to the above-described step 13 in FIG. 7, the square root RTTA of the intake air temperature TA is calculated by searching a map, not shown, according to the intake air temperature TA. After that, in a step 76, a rotational speed-dependent correction coefficient KTHNE is calculated by searching a map shown in FIG. 14 according to the engine speed NE. The rotational speed-dependent correction coefficient KTHNE is a value for correcting a pressure loss of an air cleaner (not shown) disposed at a location upstream of the air flow sensor 20.

In a step 77 following the step 76, an estimated passing air amount HGAIRTH is calculated by the following equation (19):

$$HGAIRTH = \frac{KTHCOR \cdot KC \cdot KTH \cdot HPAD \cdot FPBAPA}{RGAS \cdot RTTA} \quad (19)$$

This equation (19) corresponds to an equation obtained by replacing the passing air amount GAIRTH on the right side of the aforementioned equation (6) with the estimated passing air amount HGAIRTH, and the atmospheric pressure PA on the left side thereof with the delayed estimated atmospheric pressure HPAD.

Next, the process proceeds to a step 78, wherein an air amount difference DGAIR is calculated by the following equation (20):

$$DGAIR=HGAIRTH-GAIR \quad (20)$$

Figure 15:
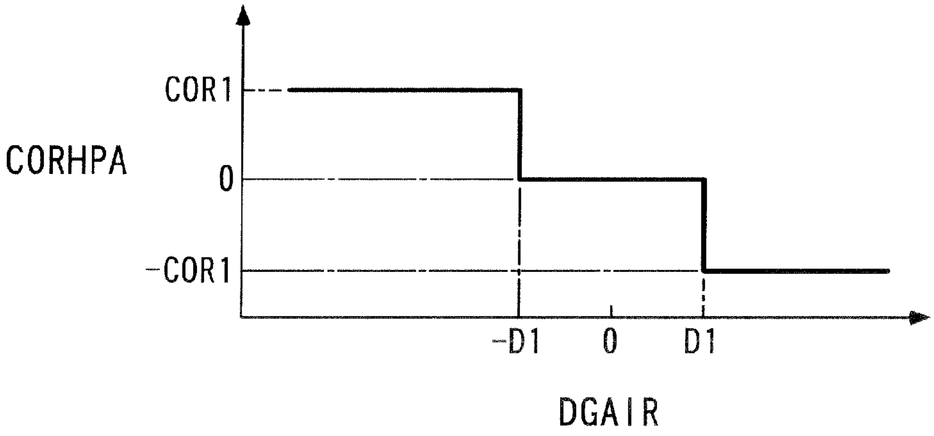
FIG. 15 A diagram showing an example of a map for use in calculating a correction term CORHPA.

Then, in a step 79, it is determined whether or not the vehicle speed VP is higher than a predetermined vehicle speed VP VPL. If the answer to this question is affirmative (YES), it is determined that the vehicle is traveling, and the process proceeds to a step 80, wherein the correction term CORHPA is calculated by searching a map shown in FIG. 15 according to the air amount difference DGAIR.

On the other hand, if the answer to the question of the step 79 is negative (NO), it is determined that the vehicle is at a stop, and the process proceeds to a step 81, wherein the correction term CORHPA is set to 0.

In a step 82 following the above-described step 80 or 81, an updated estimated atmospheric pressure HPACAL is calculated by the following equation (21):

$$HPACAL=HPAD+CORHPA \quad (21)$$

Then, the process proceeds to a step 83, wherein the estimated atmospheric pressure HPA is calculated by a weighted average computation (average calculation) expressed by the following equation (22):

$$HPA=CA1\cdot HPACAL+(1-CA1)\cdot HPAz \quad (22)$$

In the above equation (22), CA1 represents a weight coefficient, and is set to a predetermined value such that 0<CA1<1 holds. Further, HAPz represents the immediately preceding value of the estimated atmospheric pressure HPA.

Next, in a step 84, the current value HPA of the estimated atmospheric pressure calculated as described above is set to the delayed estimated atmospheric pressure HPAD, followed by terminating the present process.

As described hereinabove, in the process for calculating the estimated atmospheric pressure HPA, the updated estimated atmospheric pressure HPACAL is calculated by correcting the immediately preceding value HPAz of the estimated atmospheric pressure using the correction term CORHPA, and the correction term CORHPA is calculated according to the air amount difference DGAIR, so that the updated estimated atmospheric pressure HPACAL is calculated such that the air amount difference DGAIR becomes equal to 0. In other words, the updated estimated atmospheric pressure HPACAL is calculated such that the estimated passing air amount HGAIRTH becomes equal to the intake air amount GAIR, and the estimated atmospheric pressure HPA is calculated by weighted average calculation of the updated estimated atmospheric pressure HPACAL calculated as above and the immediately preceding value HPAz of the estimated atmospheric pressure. Therefore, it is possible to calculate the estimated atmospheric pressure HPA such that it accurately follows an actual atmospheric pressure PA.

Hereinafter, the process for calculating the intake air amount GAIR will be described with reference to FIG. 16. As described hereinafter, this process calculates the intake air amount GAIR using an output voltage value VAFM of the detection signal from the air flow sensor 20, and is executed by the ECU 2 whenever the CRK signal is generated a predetermined number of times.

Figure 17:
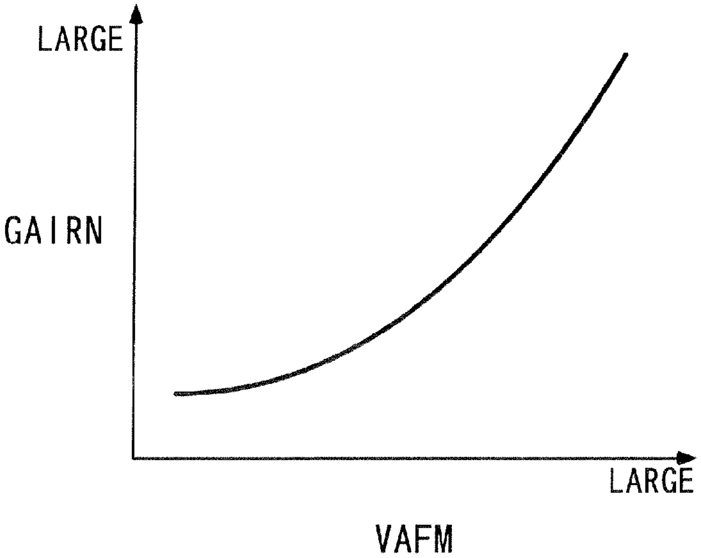
FIG. 17 A diagram showing an example of a map for use in calculating a basic intake air amount GAIRN.

First, in a step 90, the basic intake air amount GAIRN is calculated by searching a map shown in FIG. 17 according to the output voltage value VAFM.

Next, the process proceeds to a step 91, wherein a value GAIRN/KAFMERR obtained by dividing the basic intake air amount GAIRN by the correction coefficient KAFMERR is set as the intake air amount GAIR. A method of calculating the correction coefficient KAFMERR will be described hereinafter. After the intake air amount GAIR is calculated in the step 91 as described above, the present process is terminated. Note that in the present embodiment, the basic intake air GAIRN corresponds to the basic intake parameter and the correction coefficient KAFMERR corresponds to the correction value and the second correction value.

The reason for using the correction coefficient KAFMERR as a value for dividing the basic intake air amount GAIRN is the same as the reason for calculating the above-described error-dependent correction coefficient KTHCOR as the reciprocal of the function value error KTHERR.

Figure 16:
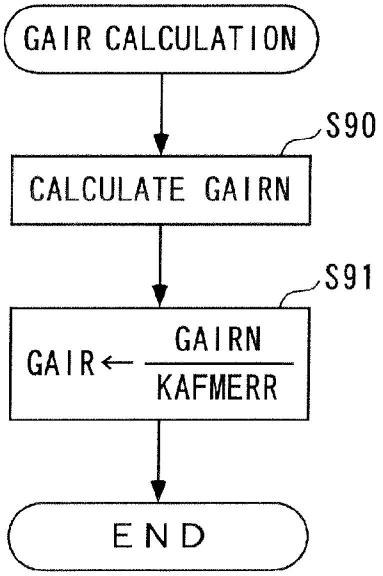
FIG. 16 A flowchart of a process for calculating an intake air amount GAIR.

Note that the intake air amount GAIR calculated in the calculation process in FIG. 16 is used in various control processes executed by the ECU 2. For example, the intake air amount GAIR is used when a fuel injection amount and ignition timing are calculated in the fuel injection control process and the ignition timing control process.

Next, a process for calculating the above-described correction coefficient KAFMERR will be described with reference to FIG. 18. This process calculates the correction coefficient KAFMERR by a method using the above-described function value error KTHERR, and is executed by the ECU 2 whenever the CRK signal is generated a predetermined number of times.

As shown in the figure, first, in a step 100, the map value KTH of the opening function value is calculated in a manner similar to the above-described step 11 in FIG. 7.

Then, the process proceeds to a step 101, wherein the flow rate function value FPBAPA is calculated. In this case, the flow rate function value FPBAPA is calculated by searching a map obtained by replacing the pressure ratio R_PH on the horizontal axis in the above-described map in FIG. 6 with the pressure ratio R_P (=PBA/PA), according to the pressure ratio R_P.

Next, in a step 102, the square root RTTA of the intake air temperature TA is calculated in a manner similar to the above-described step 13 in FIG. 7. Then, in a step 103, the model equation value KTHCAL of the opening function value is calculated by the following equation (23). This equation (23) corresponds to an equation obtained by replacing KTH on the left side of the aforementioned equation (7) with KTHCAL.

$$KTHCAL=\frac{GAIR\cdot RGAS\cdot RTTA}{KC\cdot FPBAPA\cdot PA} \quad (23)$$

In a step 104 following the step 103, the function value error KTHERR is set to the ratio KTHCAL/KTH between the model equation value and the map value.

Then, the process proceeds to a step 105, wherein it is determined whether or not the throttle valve opening TH is smaller than the aforementioned predetermined opening degree THB. If the answer to this question is affirmative (YES), the present process is immediately terminated.

On the other hand, if the answer to the question of the step 105 is negative (NO), the process proceeds to a step 106, wherein it is determined whether or not the pressure ratio R_P is lower than the critical pressure ratio R_CRIT. If the answer to this question is negative (NO), the present process is immediately terminated.

On the other hand, if the answer to the question of the step 106 is affirmative (YES), i.e. if $THB \leq TH$ and at the same time $R\_CRIT < R\_P$, it is judged that the throttle valve opening TH is in a region where a modeling error is caused by the above-described second error, and the correction coefficient KAFMERR should be updated, so that the process proceeds to a step 107, wherein the correction coefficient KAFMERR is calculated by the following equation (24), followed by terminating the present process.

$$KAFMERR = CA2 \cdot KHERR + (1 - CA2) \cdot KAFMERRz \quad (24)$$

In the above equation (24), CA2 represents a weight coefficient, and is set to a predetermined value such that $0 < CA2 < 1$ holds. Note that the weight coefficient CA2 may be calculated by a method of searching a map according the engine speed NE. Further, in the equation (24), KAFMERRz represents the immediately preceding value of the correction coefficient KAFMERR.

As described hereinabove, in the calculation process in FIG. 18, since the correction coefficient KAFMERR is calculated by weighted average calculation of the immediately preceding value KAFMERRz of the correction coefficient and the function value error KTHERR, it is possible to calculate the correction coefficient KAFMERR as a value reflecting a modeling error represented by the function value error KTHERR. For the same reason, even when the calculation error is temporarily and sharply increased in the result of calculation of the function value error KTHERR due to some cause, it is possible to accurately calculate the correction coefficient KAFMERR while avoiding the adverse influence of the increase in the calculation error.

Next, the process for calculating the intake pressure PBA will be described with reference to FIG. 19. As described hereinafter, this process calculates the intake pressure PBA using an output voltage value VPBA of the detection signal from the intake pressure sensor 22, and is executed by the ECU 2 whenever the CRK signal is generated a predetermined number of times.

First, in a step 110, the basic intake pressure PBAN is calculated based on the output voltage value VPBA by the following equation (25). Note that α, β, and γ in the equation (25) represent predetermined values.

$$PBAN = \alpha \cdot (VPBA - \beta) + \gamma \quad (25)$$

Then, the process proceeds to a step 111, wherein the intake pressure PBA is set to the sum of the basic intake pressure PBAN and the correction term PBAERRCOR (PBAN+PBAERRCOR). A method of calculating the correction term PBAERRCOR will be described hereinafter. After the intake pressure PBA is calculated in the step 111 as described above, the present process is terminated. Note that in the present embodiment, the basic intake pressure PBAN corresponds to the basic intake parameter, and the correction term PBAERRCOR corresponds to the correction value and a third correction value.

Figure 19:
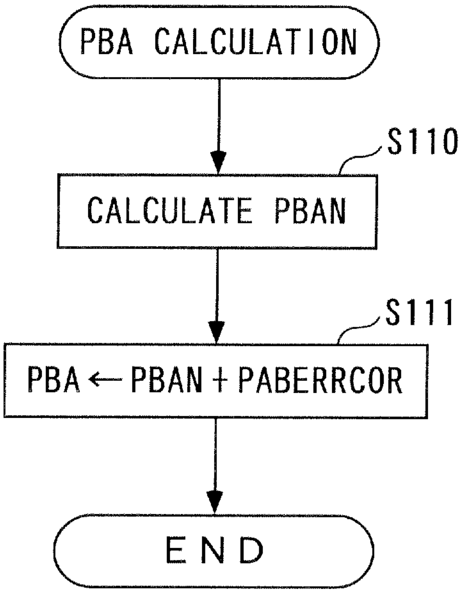
FIG. 19 A flowchart of a process for calculating an intake pressure PBA.

In this case, the intake pressure PBA calculated in the calculation process in FIG. 19 is used in various control processes executed by the ECU 2. For example, the intake pressure PBA is used when the fuel injection amount and the ignition timing are calculated in the fuel injection control process and the ignition timing control process.

Figure 20:
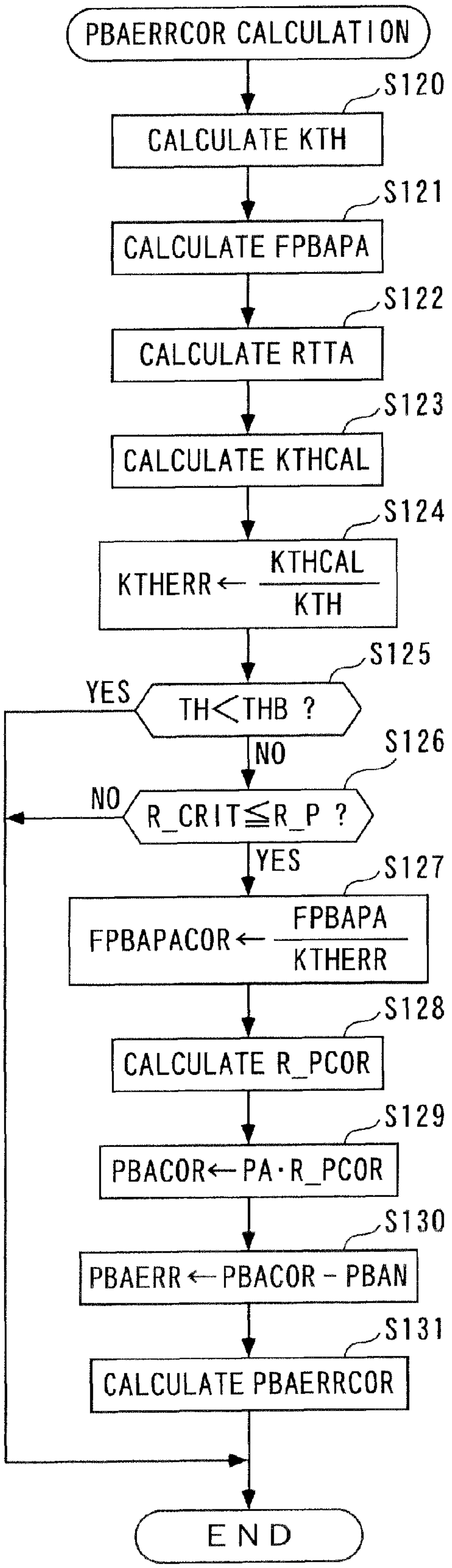
FIG. 20 A diagram showing an example of a map for use in calculating a correction term PBAERRCOR.

Next, a process for calculating the above-mentioned correction term PBAERRCOR will be described with reference to FIG. 20. This process calculates the correction term PBAERRCOR by a method using the above-described function value error KTHERR, and is executed by the ECU 2 whenever the CRK signal is generated a predetermined number of times.

Figure 18:
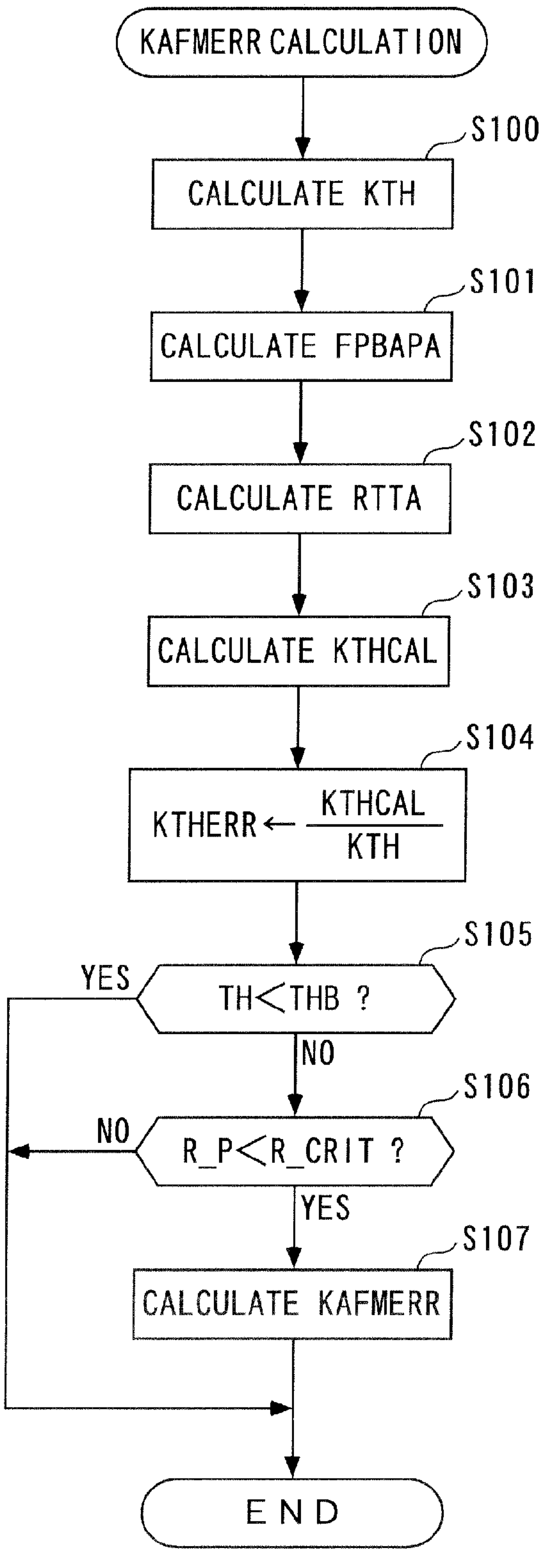
FIG. 18 A flowchart of a process for calculating a correction coefficient KAFMERR.

As is apparent from the figure, steps 120 to 125 in the process are configured similarly to the steps 100 to 105 in FIG. 18, and hence the following description is mainly given of step 126 et seq. In the process for calculating the correction term PBAERRCOR, if the answer to the question of the step 125 is affirmative (YES), i.e. if $THB \leq TH$ holds, the process proceeds to the step 126, wherein it is determined whether or not the pressure ratio R_P is not lower than the critical pressure ratio R_CRIT. If the answer to this question is negative (NO), the present process is immediately terminated.

On the other hand, if the answer to the question of the step 126 is affirmative (YES), i.e. if $R\_CRIT \leq R\_P$ holds, it is determined that the pressure ratio R_P is in a region where a modeling error is caused by the above-described third error, and the correction term PBAERRCOR should be updated, so that the process proceeds to a step 127, wherein a correction calculation value FPBAPACOR of the flow rate function value is set to a ratio FPBAPA/KTHERR between the flow rate function value and the function value error. This correction calculation value FPBAPACOR of the flow rate function value represents an error of the flow rate function value FPBAPA caused by the modeling error.

Figure 21:
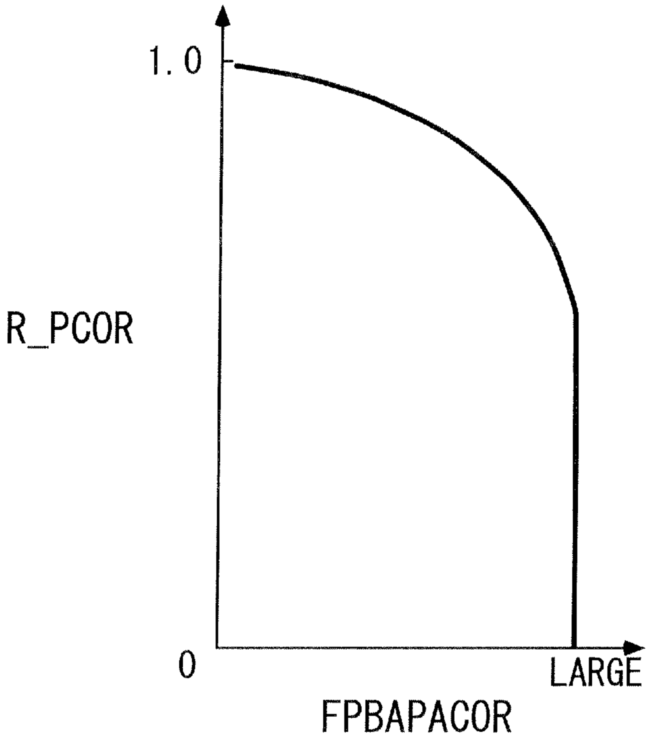
FIG. 21 A diagram showing an example of a map for use in calculating a correction calculation value R_PCOR of a pressure ratio.

Then, the process proceeds to a step 128, wherein a correction calculation value R_PCOR of the pressure ratio is calculated by searching a map shown in FIG. 21 according to the correction calculation value FPBAPACOR of the flow rate function value. This map corresponds to a map obtained by exchanging the relationships between the horizontal axis and the vertical axis of the above-described map in FIG. 6, and replacing the variable on the vertical axis with the correction calculation value R_PCOR of the pressure ratio and the variable on the horizontal axis with the correction calculation value FPBAPACOR of the flow rate function value. The correction calculation value R_PCOR of the pressure ratio calculated as above represents an error of the pressure ratio R_P caused by the modeling error.

Next, in a step 129, a correction calculation value PBACOR of the intake pressure is set to a product PA·R_PCOR of the atmospheric pressure PA and the correction calculation value R_PCOR of the pressure ratio. The correction calculation value PBACOR of the intake pressure represents an error of the intake pressure PBA caused by the modeling error. Further, in a step 130 following the step 129, an intake pressure error PBAERR is set to a difference PBACOR−PBAN between the correction calculation value PBACOR of the intake pressure and the basic intake pressure PBAN.

Then, the process proceeds to a step 131, wherein the correction term PBAERRCOR is calculated by the following equation (26), followed by terminating the present process.

$$PBAERRCOR = CA3 \cdot PBAERR + (1 - CA3) \cdot PBAERRCORz \quad (26)$$

In the above equation (26), CA3 represents a weight coefficient, and is set to a predetermined value such that $0 < CA3 < 1$ holds. Note that the weight coefficient CA3 may be calculated by a method of searching a map according the engine speed NE. Further, in the equation (26), PBAERRCORz represents the immediately preceding value of the correction term PBAERRCOR.

As described hereinabove, in the calculation process in FIG. 20, since the correction term PBAERRCOR is calculated by weighted average calculation of the immediately preceding value PBAERRCORz of the correction term and the intake pressure error PBAERR, it is possible to calculate the correction term PBAERRCOR as a value reflecting a modeling error represented by the function value error KTHERR. For the same reason, even when the calculation error is temporarily and sharply increased in the result of calculation of the function value error KTHERR due to some cause, it is possible to accurately calculate the correction term PBAERRCOR while avoiding the adverse influence of the increase in the calculation error.

As described heretofore, according to the intake parameter-calculating device 1 of the first embodiment, when the passing air amount GAIRTH is calculated, the function value error KTHERR is calculated as the ratio between the map value KTH and the model equation value KTHCAL of the opening function value, whereby the function value error KTHERR is calculated as a value representing the modeling error of the model equation (6). Within the region of TH<THB, the model parameter A is identified onboard using the function value error KTHERR calculated as above; the correction coefficient KTHCOR is calculated using the model parameter A identified onboard; and the basic passing air amount GAIRTHN is corrected using the correction coefficient KTHCOR, whereby the passing air amount GAIRTH is calculated. This makes it possible to calculate the passing air amount GAIRTH as a value obtained by correcting the modeling error of the model equation (6), whereby it is possible to accurately calculate the passing air amount GAIRTH.

Further, in the equations (11) and (12) for calculating the passing air amount GAIRTH, the estimated atmospheric pressure HPA is used in place of the atmospheric pressure PA, and hence even under a condition in which the atmospheric pressure PA is apt to change, it is possible to calculate the passing air amount GAIRTH while avoiding the adverse influence of a change in the atmospheric pressure PA, thereby making it possible to further improve the calculation accuracy of the passing air amount GAIRTH.

Furthermore, the model parameter A is identified onboard, and hence due to aging of the throttle valve 7*a* and variation between individual products of the throttle valve 7*a*, even when error the model equation (8) deviates from the actual relationship between the error KTHERRCOR and the throttle valve opening TH, i.e. even when a modeling error is caused, it is possible to quickly compensate for the modeling error by using the model parameter A identified onboard, whereby it is possible to quickly cause the error model equation (9) to match the actual relationship between the error KTHERRCOR and the throttle valve opening TH. This makes it possible to enhance the accuracy of correction by the correction coefficient KTHCOR, thereby making it possible to further improve the calculation accuracy of the passing air amount GAIRTH.

Further, in the identifying calculation for identifying the model parameter A, the weighted average value XXYTTL is calculated by performing the weighted average calculation with uniform weighting on the four arithmetic mean values of the values $KTHERRCOR \cdot (TH-THB)^2$ calculated for the respective regions of the throttle valve opening TH; the weighted average value XXXXTTL is calculated by performing the weighted average calculation with uniform weighting on the four arithmetic mean values of the values $(TH-THB)^4$ calculated for the respective regions of the throttle valve opening TH; and the model parameter A is calculated by dividing the former by the latter. As a consequence, during the identifying calculation for identifying the model parameter A, even if sampling data items of the throttle valve opening TH are collected from one particular region in a biased manner, the degree of reflection of the result of calculation in the one particular region on the result of calculation of the model parameter A can be made equal to the degree thereof in the other regions, thereby making it possible to ensure high accuracy of the result of calculation of the model parameter A.

Furthermore, when the total travelled distance DIST of the vehicle after the start of the engine 3 is smaller than the predetermined value DLEARN, the identifying calculation for identifying the model parameter A is executed while using the initial estimated atmospheric pressure HPAini in place of the atmospheric pressure PA, and when DIST≥DLEARN holds, the identifying calculation of the model parameter A is inhibited. In this case, when the total travelled distance DIST of the vehicle after the start of the engine 3 is small, the throttle valve opening TH is within a region of a small opening degree, and the frequency of entering the state of TH<THB is high. This makes it possible to enhance the frequency of the identifying calculation of the model parameter A, whereby it is possible to further improve the calculation accuracy of the model parameter A.

In addition to this, when the model equation value KTHCAL of the opening function value is calculated, the initial estimated atmospheric pressure HPAini is used in place of the atmospheric pressure PA, and therefore even under a condition in which the atmospheric pressure PA is apt to change, the function value error KTHERR can be accurately calculated, whereby it is possible to further improve the calculation accuracy of the model parameter A. As described hereinabove, high calculation accuracy can be ensured in the calculation of the model parameter A, whereby it is possible to further improve the calculation accuracy of the correction coefficient KTHCOR, that is, the calculation accuracy of the passing air amount GAIRTH.

On the other hand, in the region of THB≤TH, the identifying calculation of the model parameter A is stopped, and hence it is possible to avoid unnecessary identifying calculation in a region where no modeling error is caused, whereby it is possible to reduce the computational load.

Further, when the intake air amount GAIR is calculated, the intake air amount GAIR is calculated by correcting the basic intake air amount GAIRN using the correction coefficient KAFMERR. The correction coefficient KAFMERR is calculated by weighted average calculation of the function value error KTHERR representing the modeling error and the immediately preceding value KAFMERRz of the correction coefficient, when THB≤TH and at the same time R_P<R_CRIT, i.e. when it is estimated that the modeling error of the model equation (6) is caused by the above-described second error. This makes it possible to calculate the correction coefficient KAFMERR as a value reflecting the modeling error represented by the function value error KTHERR, thereby making it possible to accurately calculate the intake air amount GAIR.

Furthermore, when the intake pressure PBA is calculated, the intake pressure PBA is calculated by correcting the basic intake pressure PBAN using the correction term PBAERRCOR. The correction term PBAERRCOR is calculated using the function value error KTHERR representing the modeling error, when R_CRIT≤R_P, that is, when it is estimated that the modeling error of the model equation (6) is caused by the above-described third error. Therefore, it is possible to calculate the correction term PBAERRCOR as a value reflecting the modeling error represented by the function value error KTHERR, thereby making it possible to accurately calculate the intake pressure PBA.

Further, since the estimated passing air amount HGAIRTH is calculated using the intake pressure PBA and the intake air amount GAIR calculated as above, and the above-described correction coefficient KTHCOR, it is possible to improve the calculation accuracy of the estimated passing air amount HGAIRTH. Further, the correction term CORHPA is calculated using the air amount difference DGAIR that is a value obtained by subtracting the intake air amount GAIR from the estimated passing air amount HGAIRTH, and the estimated atmospheric pressure HPA is updated using the correction term CORHPA, so that it is possible to improve the calculation accuracy of the estimated atmospheric pressure HPA. In addition to this, since the passing air amount GAIRTH is calculated using the estimated atmospheric pressure HPA updated as above, it is possible to further improve the calculation accuracy of the passing air amount GAIRTH.

Figure 9:
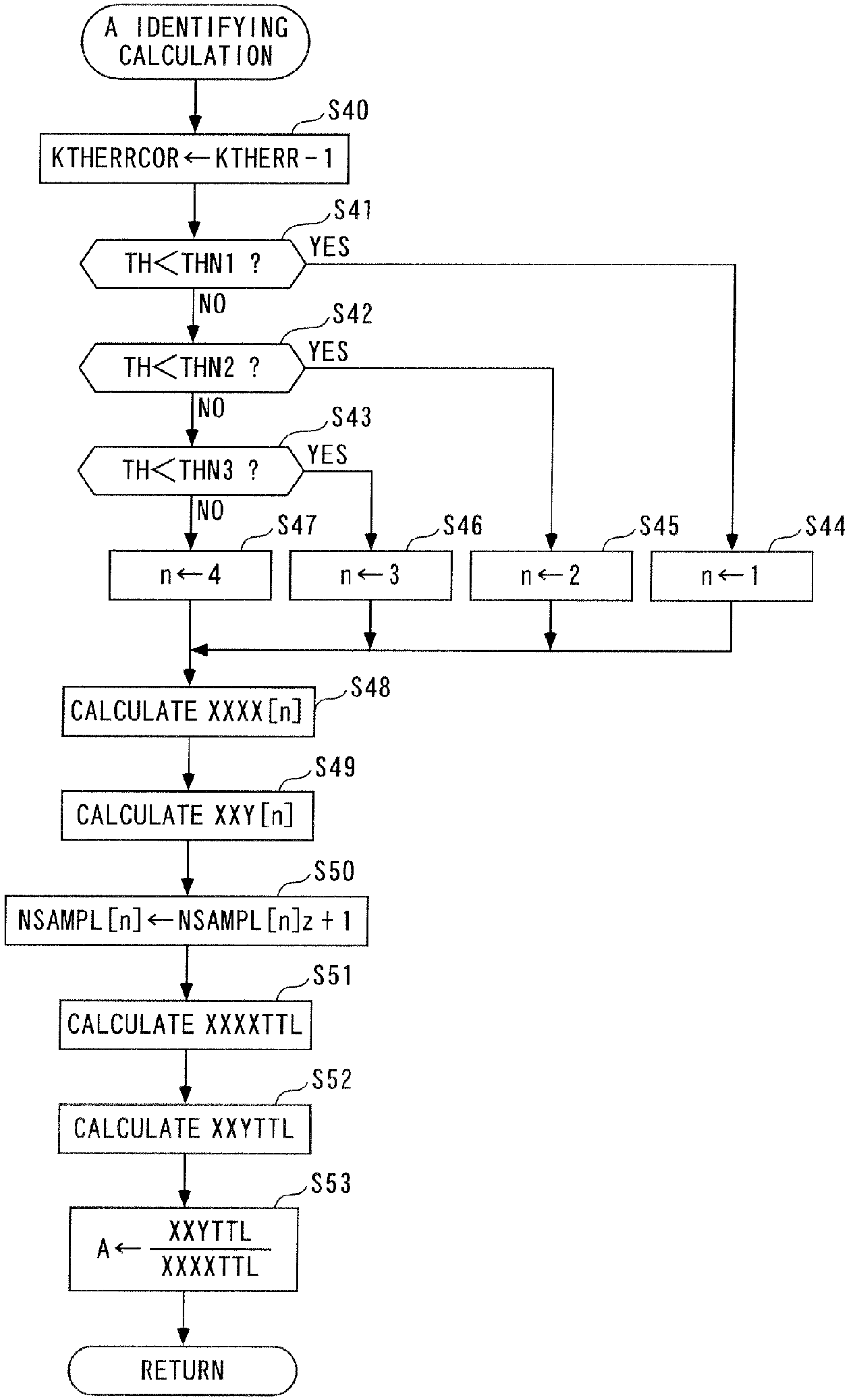
FIG. 9 A flowchart of an identifying calculation process for identifying a model parameter A.

Note that although in the first embodiment, as the method of identifying calculation of the model parameter A, the method is employed which calculates the two weighted average values XXXXTTL and XXYTTL by the aforementioned equations (16) and (17) in the steps 51 and 52 in FIG. 9, respectively, and then calculates the model parameter A by the aforementioned equation (18) in the step 53, this method may be replaced by the following identifying calculation method:

The identifying calculation method may be configured such that in the steps 51 and 52, the two weighted average values XXXXTTL and XXYTTL are calculated using the following equations (27) and (28) in place of the aforementioned equations (16) and (17), respectively, and then the model parameter A is calculated by using the above-described equation (18) in the step 53.

$$XXXXTTL = KG1\cdot\frac{XXXX[1]}{NSAMPL[1]} + KG2\cdot\frac{XXXX[2]}{NSAMPL[2]} + KG3\cdot\frac{XXXX[3]}{NSAMPL[3]} + KG4\cdot\frac{XXXX[4]}{NSAMPL[4]} \tag{27}$$

$$XXYTTL = KG1\cdot\frac{XXY[1]}{NSAMPL[1]} + KG2\cdot\frac{XXY[2]}{NSAMPL[2]} + KG3\cdot\frac{XXY[3]}{NSAMPL[3]} + KG4\cdot\frac{XXY[4]}{NSAMPL[4]} \tag{28}$$

In the above equations (27) and (28), KG1 to KG4 represent weight coefficients, and are set such that KG1>KG2>KG3>KG4 holds and at the same time KG1+KG2+KG3+KG4=1 holds. As is apparent from the above equation (27), the weighted average value XXXXTTL is calculated by performing the weighted average calculation on the arithmetic mean values of the values $(TH-THB)^4$ in the four regions of the throttle valve opening TH, and the weight coefficients KG1 to KG4 therefor are set to larger values as the region is a region of smaller throttle valve opening TH. Further, the weighted average value XXYTTL as well is calculated by performing the weighted average calculation on the arithmetic mean values of the values $KTHERRCOR\cdot(TH-THB)^2$ in the four regions of the throttle valve opening TH, and the weight coefficients KG1 to KG4 therefor are set to the same values as those for the weighted average value XXXXTTL.

In this case, the function value error KTHERR is caused by the deviation of the opening area of the throttle valve 7*a* from that of a standard (reference) throttle valve, as described hereinabove, and the degree of influence of the deviation becomes larger as the throttle valve opening TH is smaller. Therefore, by setting the four weight coefficients KG1 to KG4 as described above, it is possible to identify the model parameter A while causing such a degree of influence of the deviation to be reflected thereon, thereby making it possible to improve the calculation accuracy of the correction coefficient KTHCOR. Note that the above-described weight coefficients KG1 to KG4 may be set such that any of them have the same value.

Further, although the first embodiment is an example which employs the error model equation in the form of $Y=A\cdot X^2$, the error model equation for use in the present invention is not limited to this, but there may be employed one in the form of $Y=a\cdot X^2+b\cdot X+c$ or one in the form of $Y=a\cdot X+b$. Note that when a case where the error model equations in these forms are employed and a case where the error model equation (8) of the first embodiment is employed are compared with each other, the case where the error model equation (8) of the first embodiment is employed is more excellent from the viewpoint of attaining both the enhancement of the calculation accuracy and reduction of computational load.

Furthermore, although the first embodiment is an example which the identifying calculation of the model parameter A is performed when the total travelled distance DIST of the vehicle after the start of the engine 3 is smaller than the predetermined value DLEARN, the condition for performing the identifying calculation of the model parameter A according to the present invention is not limited to this, but any suitable condition may be employed insofar as it is capable of accurately identifying the model parameter A. For example, a condition that a time period over which the engine 3 is operated after the start thereof has not exceeded a predetermined time period may be employed as the condition for performing the identifying calculation of the model parameter A.

On the other hand, although the first embodiment is an example which uses the FIG. 2 map as a correlation model, the correlation model according to the present invention is not limited to this, but any suitable correlation model may be used insofar as it represents the correlation between the degree of opening of the intake throttle valve and an opening function value. For example, an equation defining the correlation between the degree of opening of the intake throttle valve and the opening function value may be determined by offline identification, and be used as a correlation model.

Further, although the first embodiment is an example which uses the throttle valve 7*a* as an intake throttle valve, the intake throttle valve of the present invention is not limited to this, but any suitable valve may be employed insofar as it is disposed in the intake passage and is capable of varying the amount of air passing therethrough.

Furthermore, although the first embodiment is an example which uses the function value error KTHERR as a function value ratio, this is not limitative, but in place of the function value error KTHERR, the reciprocal of the function value error KTHERR may be used as the function value ratio.

On the other hand, although the first embodiment is an example which executes calculation processes whenever the CRK signal is generated a predetermined number of times, the calculation processes may be executed at a predetermined time period (e.g. 10 msec) set by a timer.

Next, a description will be given of an intake parameter-calculating device for an internal combustion engine, according to a second embodiment of the present invention. This intake parameter-calculating device according to the second embodiment is distinguished from the intake parameter-calculating device according to the first embodiment only in details of the process for calculating the passing air amount GAIRTH and the model parameter-learning process, and the other calculation processes are the same as the calculation processes according to the first embodiment. Therefore, the following description will be given only of the different calculation processes. Note that in the following description, the same component elements as those of the first embodiment are denoted by the same reference numerals, and description thereof is omitted.

Figure 22:
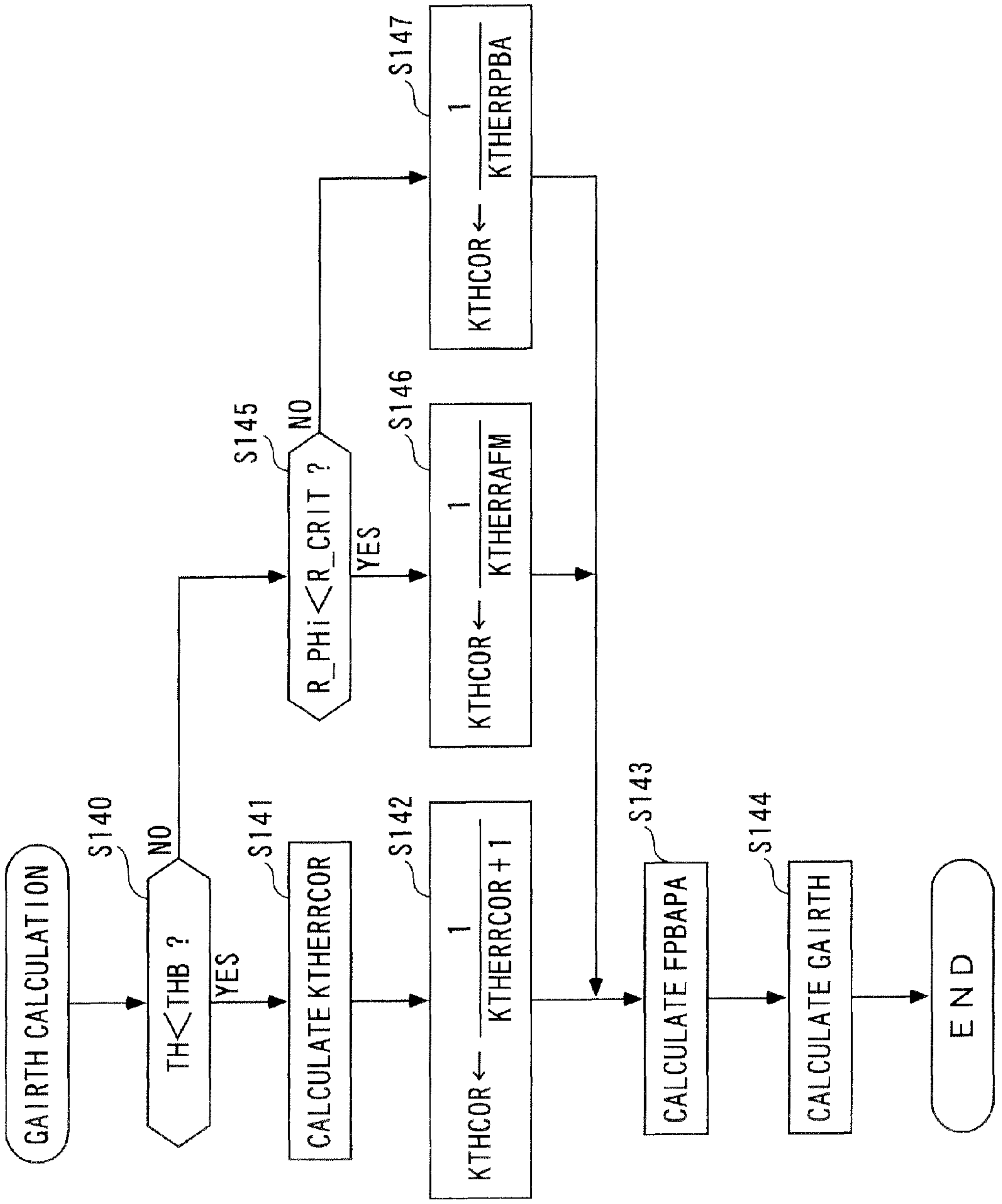
FIG. 22 A flowchart of a process for calculating a passing air amount GAIRTH according to a second embodiment.

First, the process for calculating the passing air amount GAIRTH, according to the second embodiment will be described with reference to FIG. 22. When this calculation process is compared with the above-described calculation process in FIG. 5, only steps 145 to 147 are different from the calculation process in FIG. 5, and the other steps are the same as in the FIG. 5 calculation process. Therefore, the following description is mainly given of the steps 145 to 147.

As shown in the figure, if the answer to the question of the step 140 is negative (NO), i.e. if THB≤TH holds, in the step 145, it is determined whether or not the above-described pressure ratio R_PHi is lower than the critical pressure ratio R_CRIT. If the answer to this question is affirmative (YES), i.e. if THB≤TH and at the same time R_PHi<R_CRIT hold, the process proceeds to a step 147, wherein the correction coefficient KTHCOR is set to the reciprocal of an air error KTHERRAFM (1/KTHERRAFM). The air error KTHERRAFM represents the above-described second error, and a method of calculating the same will be described hereinafter.

After the step 146 has been executed as described above, steps 143 and 144 are executed similarly to the above-described steps 5 and 6, followed by terminating the present process.

On the other hand, if the answer to the question of the step 145 is negative (NO), i.e. if R_CRIT≤R_PHi holds, the process proceeds to the step 147, wherein the correction coefficient KTHCOR is set to the reciprocal of an intake pressure error KTHERRPBA (1/KTHERRPBA). The intake pressure error KTHERRPBA represents the above-described third error, and a method of calculating the same will be described hereinafter.

After the step 147 has been executed as described above, the steps 143 and 144 are executed, as described above, followed by terminating the present process.

Figure 23:
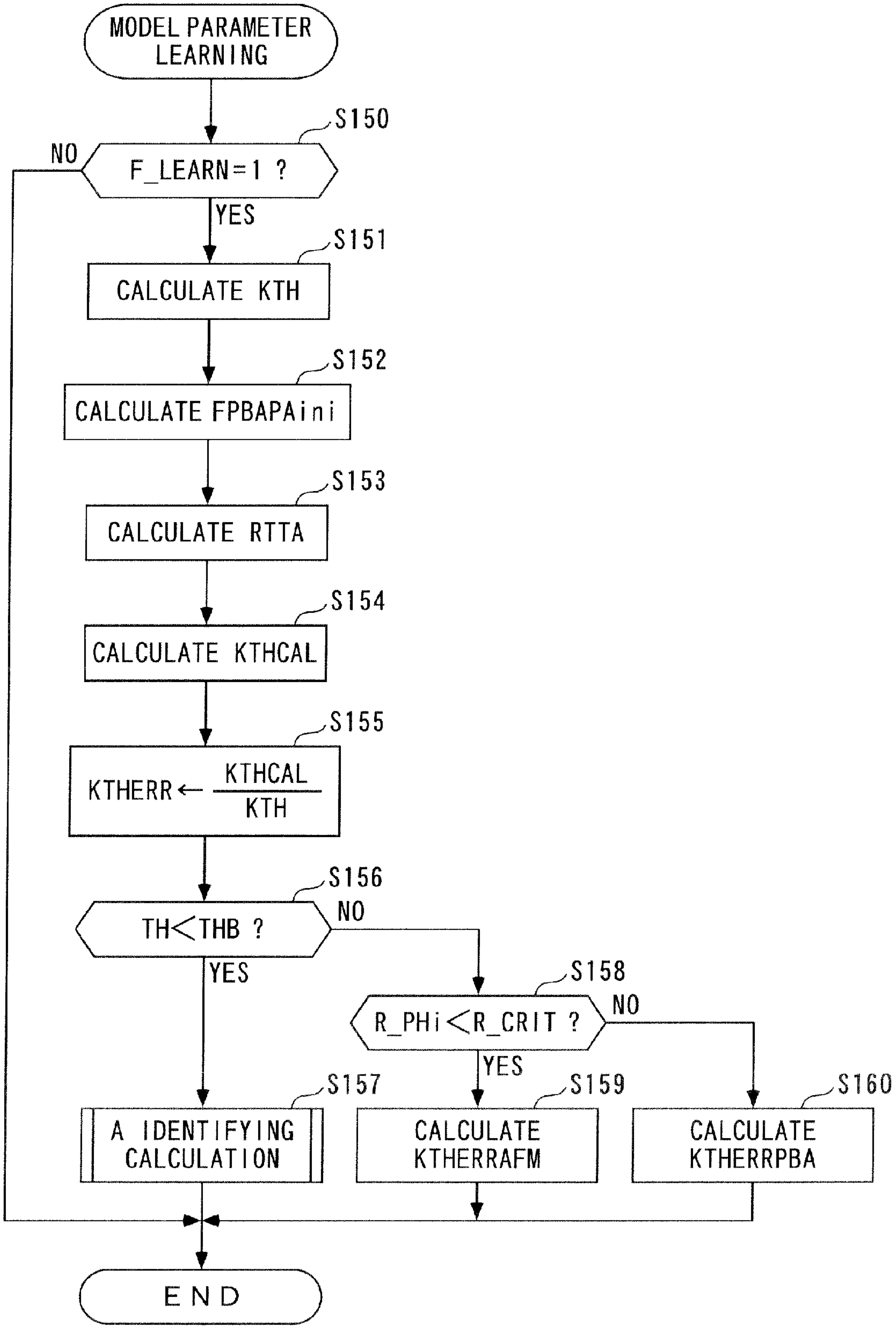
FIG. 23 A flowchart of a model parameter learning process according to the second embodiment.

Next, the model parameter-learning process according to the second embodiment will be described with reference to FIG. 23. The model parameter-learning process in the figure is distinguished from the above-described model parameter-learning process in FIG. 7 only in the steps 158 to 160, and the other steps are the same as in the calculation process in FIG. 7. Therefore, the following description is mainly given of the steps 158 to 160.

As shown in the figure, if the answer to the question of the step 156 is affirmative (YES), i.e. if TH<THB holds, in a step 157, identifying calculation for identifying the model parameter A is executed in a manner similar to the above-described step 17 in FIG. 7, followed by terminating the present process.

On the other hand, if the answer to the question of the step 156 is negative (NO), i.e. if THB≤TH holds, the process proceeds to a step 158, wherein it is determined whether or not the above-described pressure ratio R_Phi is lower than the critical pressure ratio R_CRIT. If the answer to this question is affirmative (YES), i.e. if THB≤TH and at the same time R_PHi<R_CRIT hold, the process proceeds to a step 159, wherein the air error KTHERRAFM is calculated by the following equation (29), followed by terminating the present process.

$$KTHERRAFM = CA4 \cdot KTHERR + (1 - CA4) \cdot KTHERRAFMz \tag{29}$$

In the above equation (29), CA4 represents a weight coefficient, and is set to a predetermined value such that 0<CA4<1 holds. Note that the weight coefficient CA4 may be calculated by a method of searching a map according to the engine speed NE. Further, in the equation (29), KTHERRAFMz represents the immediately preceding value of the air error KTHERRAFM.

On the other hand, if the answer to the question of the step 158 is negative (NO), i.e. if R_CRIT≤R_PHi holds, the process proceeds to a step 160, wherein the intake pressure error KTHERRPBA is calculated by the following equation (30), followed by terminating the present process.

$$KTHERRPBA = CA5 \cdot KTHERR + (1 - CA5) \cdot KTHERRPBAz \tag{30}$$

In the above equation (30), CA5 represents a weight coefficient, and is set to a predetermined value such that 0<CA5<1 holds. Note that the weight coefficient CA5 may be calculated by a method of searching a map according to the engine speed NE. Further, in the equation (30), KTHERRPBAz represents the immediately preceding value of the intake pressure error KTHERRPBA.

As described above, according to the intake parameter-calculating device of the second embodiment, when TH<THB holds, the correction coefficient KTHCOR is calculated by the same method as employed in the intake parameter-calculating device 1 of the first embodiment, so that it is possible to obtain the same advantageous effects as provided by the intake parameter-calculating device 1 of the first embodiment.

Further, if THB≤TH and at the same time R_PHi<R_CRIT hold, the correction coefficient KTHCOR is calculated as the reciprocal of the air error KTHERRAFM, and the air error KTHERRAFM is calculated by the weighted average calculation of the function value error KTHERR and the immediately preceding value KTHERRAFMz of the air error [equation (29)]. Therefore, the correction coefficient KTHCOR can be calculated as a value reflecting the modeling error estimated to have been caused by the above-described second error. For the same reason, even when the calculation error is temporarily increased in the result of calculation of the function value error KTHERR due to some cause, it is possible to accurately calculate the correction coefficient KTHCOR while avoiding the adverse influence of the increase in the calculation error. As a result, it is possible to accurately calculate the passing air amount GAIRTH.

Furthermore, if R_CRIT≤R_PHi holds, the correction coefficient KTHCOR is calculated as the reciprocal of the intake pressure error KTHERRPBA, and the intake pressure error KTHERRPBA is calculated by the weighted average calculation of the function value error KTHERR and the immediately preceding value KTHERRPBAz of the intake pressure error [equation (30)]. Therefore, the correction coefficient KTHCOR can be calculated as a value reflecting the modeling error estimated to have been caused by the above-described third error. For the same reason, even when the calculation error is temporarily increased in the result of calculation of the function value error KTHERR due to some cause, it is possible to accurately calculate the correction coefficient KTHCOR while avoiding the adverse influence of the increase in the calculation error. As a result, it is possible to accurately calculate the passing air amount GAIRTH.

Next, a description will be given of an intake parameter-calculating device for an internal combustion engine, according to a third embodiment of the present invention. This intake parameter-calculating device according to the third embodiment is distinguished from the intake parameter-calculating device according to the first embodiment in details of the process for calculating the passing air amount GAIRTH and in that the above-described model parameter-learning process in FIG. 7 is replaced by a map update process, described hereinafter. In the other respects, the intake parameter-calculating device according to the third embodiment has the same configuration as that of the intake parameter-calculating device according to the first embodiment, and therefore the following description will be given only of the above different points.

Note that in the following description, the same component elements as those of the first embodiment are denoted by the same reference numerals, and description thereof is omitted. Further, in the present embodiment, the ECU 2 corresponds to arithmetic mean value-calculating means and storage means.

Figure 24:
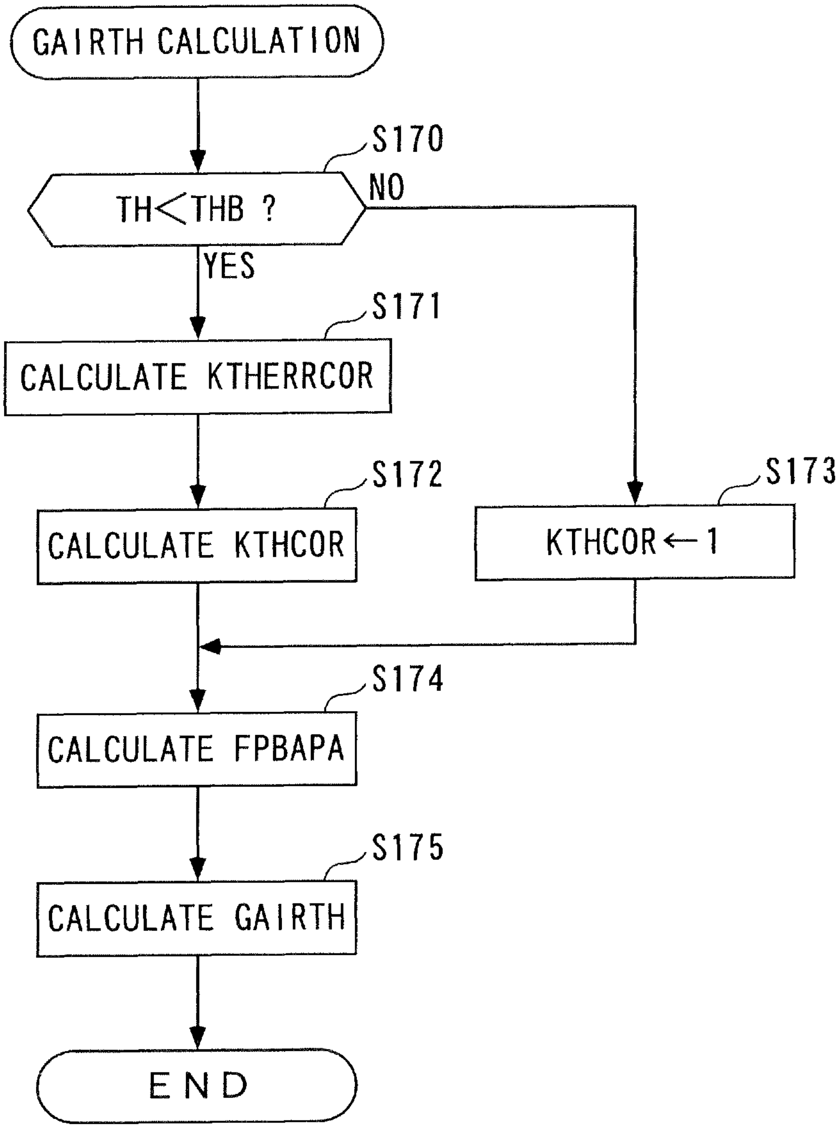
FIG. 24 A flowchart of a process for calculating a passing air amount GAIRTH according to a third embodiment.

First, the process for calculating the passing air amount GAIRTH, according to the third embodiment, will be described with reference to FIG. 24. When this calculation process is compared with the above-described calculation process in FIG. 5, steps 170 and 172 to 175 in FIG. 24 are the same as the steps 1 and 3 to 6 in FIG. 5, and only a step 171 is different from the calculation process in FIG. 5. Therefore, the following description is mainly given of the step 171.

As shown in FIG. 24, if the answer to the question of the step 170 is affirmative (YES), i.e. if TH<THB holds, the process proceeds to the step 171, wherein the error KTHERRCOR is calculated by searching a map shown in FIG. 25 according to the throttle valve opening TH. As shown in the figure, in this map, in a region from a value of 1 (units: degrees of angle) to a predetermined value THB of the throttle valve opening TH, map values KTHERRCOR[1] to KTHERRCOR [THB−1] and 1 of the error KTHERRCOR are set in a manner associated with the values of the throttle valve opening TH each of which is incremented from the preceding value by one degree. Out of these map values, the map values KTHERRCOR[1] to KTHERRCOR[THB−1] are updated in the map update process, described hereinafter, but when TH=THB holds, the map values are always held at 1 without being updated. The reason for this is that no modeling error is caused by the above-described first error in the region of THB≤TH, as described hereinabove.

After the error KTHERRCOR is calculated by the above-described method in the step 171, in the step 172, the correction coefficient KTHCOR is calculated by the same method as employed in the above-described step 3 in FIG. 5. Then, in the steps 174 and 175, the flow rate function value FPBAPA and the passing air amount GAIRTH are calculated by the same methods as employed in the above-described steps 5 and 6 in FIG. 5, respectively, followed by terminating the present process.

Next, the map update process will be described with reference to FIG. 26. This map update process updates the above-described map values KTHERRCOR[1] to KTHERRCOR [THB−1] in the map in FIG. 25, and is executed by the ECU 2 whenever the CRK signal is generated a predetermined number of times.

Figure 26:
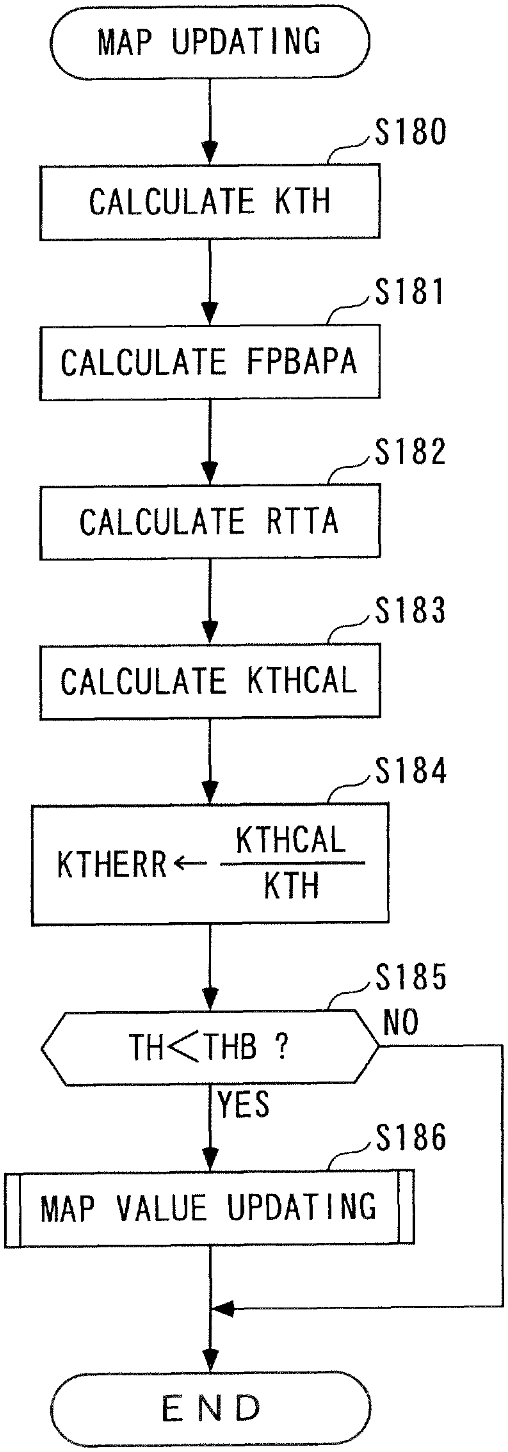
FIG. 26 A flowchart of a map update process.

When the calculation process in the figure is compared with the above-described model parameter-learning process in FIG. 7, steps 180 and 182 to 185 in FIG. 26 are the same as the steps 11 and 13 to 16 in FIG. 7, and only steps 181 and 186 are different from the FIG. 7 calculation process. Therefore, the following description is mainly given of the steps 181 and 186.

As shown in the figure, in the step 180, the map value KTH is calculated by the same method as employed in the above-described step 11 in FIG. 7, whereafter in the step 181, the flow rate function value FPBAPA is calculated by searching the above-described map in FIG. 6 according to the pressure ratio R_PH.

Then, the steps 182 to 185 are executed by the same methods as employed in the steps 13 to 16 in FIG. 7. If the answer to the question of the step 185 is affirmative (YES), i.e. if TH<THB holds, the process proceeds to the step 186, wherein the map update process for updating the map value of the error KTHERRCOR is performed. This map update process updates one of the above-described map values KTHERRCOR[1] to KTHERRCOR[THB−1], and is executed as described hereinafter.

First, it is determined to which of the set opening degrees 1° to THB−1° of the above-described map values KTHERRCOR[1] to KTHERRCOR[THB−1], the current detection value of the throttle valve opening TH is closest, and an updated map value is determined based on the result of determination. For example, when the current detection value is 0.3°, the update of the map value KTHERRCOR[1] is determined, and when the current detection value is 1.8°, the update of the map value KTHERRCOR[2] is determined. Hereinafter, a description will be given of a case where the update of the map value KTHERRCOR[1] has been determined, by way of example.

When the update of the map value KTHERRCOR[1] is determined, a value obtained by subtracting 1 from the function value error KTHERR (KTHERR−1) calculated in the above-described step 184 is set to the current value KTHERRCOR[1]_TMP of the map value KTHERRCOR[1], and the immediately preceding value ΣKTHERRCOR[1]z of the integral of the map value KTHERRCOR[1] stored in the RAM is added to the current value KTHERRCOR[1]_TMP, whereby the current value ΣKTHERRCOR[1] of the integral is calculated. Then, a value obtained by dividing the calculated current value ΣKTHERRCOR[1] of the integral by the number of samples of the map value KTHERRCOR[1] is stored in a map in the RAM as the map value KTHERRCOR [1]. That is, the map value KTHERRCOR[1] is updated to the arithmetic mean of the map value KTHERRCOR[1] sampled (calculated) up to the current control timing.

In the step 186, the process for updating the map value is executed, as described above, followed by terminating the present process.

As described hereinabove, according to the intake parameter-calculating device of the third embodiment, in the process for calculating the passing air amount GAIRTH, the error KTHERRCOR is calculated by searching the FIG. 25 map according to the throttle valve opening TH, and the correction coefficient KTHCOR is calculated using the error KTHERRCOR. In the process for updating the map value KTHERRCOR[n] in the map, the arithmetic mean value of the error KTHERRCOR is calculated in a manner associated with the region value n, and the calculated arithmetic mean value is stored as the map value KTHERRCOR[n] in the n-th region, so that the calculation accuracy of the map value can be enhanced as the process for updating the map value proceeds, whereby it is possible to improve the calculation accuracy of the passing air amount GAIRTH.

Note that although the third embodiment is an example which uses the map for use in searching the error KTHERRCOR, the intake parameter-calculating device according to the third embodiment may be configured such that a map for searching the correction coefficient KTHCOR is used in place thereof, and the map value of the correction coefficient KTHCOR is updated in the update process in the step 186. In the case of such configuration as well, it is possible to obtain the same advantageous effects as provided by the intake parameter-calculating device of the third embodiment.

Further, although the third embodiment is an example which the above-described map value KTHERRCOR[n] is set at intervals of 1°, this is not limitative, but the map values may be set at intervals of a value larger than 1° or a value smaller than 1°.

INDUSTRIAL APPLICABILITY

The present invention can be applied to the intake parameter-calculating device for calculating an intake parameter in the engine equipped with the intake throttle valve and the method of calculating the intake parameter. For example, the present invention can also be applied to intake parameter-calculating devices for calculating intake parameters in engines for ship propulsion machines and the like, and the method of calculating the intake parameters.

[Reference Signs List]

| | |
|---|---|
| 1 | intake parameter-calculating device |
| 2 | ECU (basic intake parameter-calculating means, first opening function value-calculating means, second opening function value-calculating means, correction value-calculating means, intake parameter-calculating means, basic passing air amount-calculating means, first correction value-calculating means, passing air amount-calculating means, onboard identification means, estimated upstream-side pressure-calculating means, downstream-side pressure-detecting means, arithmetic mean value-calculating means, storage means, pressure ratio-calculating means, valve opening-detecting means, basic intake air amount-calculating means, second correction value-calculating means, intake air amount-calculating means, basic downstream-side pressure-calculating means, third correction value-calculating means, and downstream-side pressure-calculating means) |
| 3 | engine |
| 6 | intake passage |
| 7a | throttle valve (intake throttle valve) |
| 20 | air flow sensor (intake air amount-detecting means) |
| 21 | throttle valve opening sensor (valve opening-detecting means) |
| 22 | intake pressure sensor (downstream-side pressure-detecting means) |
| 24 | atmospheric pressure sensor (upstream-side pressure-detecting means) |
| PA | atmospheric pressure (upstream-side pressure) |
| HPA | estimated atmospheric pressure (estimated upstream-side pressure) |
| HPAini | initial estimated atmospheric pressure (downstream-side pressure detected at the start of engine) |
| TH | degree of opening of throttle valve (valve opening degree) |
| THB | predetermined opening degree |
| KTHCAL | model equation value of opening function value (first opening function value) |
| KTH | map value of opening function value (second opening function value) |
| KTHERR | function value error (function value ratio) |
| GAIRTH | passing air amount (intake parameter) |
| GAIRTHN | basic passing air amount (basic intake parameter) |
| KTHCOR | correction coefficient (correction value, first correction value) |
| A | model parameter |
| GAIR | intake air amount (intake parameter) |
| GAIRN | basic intake air amount (basic intake parameter) |

-continued

[Reference Signs List]

| | |
|---|---|
| KAFMERR | correction coefficient (correction value, second correction value) |
| PBA | intake pressure (intake parameter, downstream-side pressure) |
| PBAN | basic intake pressure (basic intake parameter, basic downstream-side pressure) |
| PBAERRCOR | correction term (correction value, third correction value) |
| R_P | pressure ratio |
| R_CRIT | critical pressure ratio |
| DIST | total travelled distance |
| DLEARN | predetermined value |
| KG1 to KG4 | weight coefficients (weights) |

The invention claimed is:

1. An intake parameter-calculating device for an internal combustion engine, for calculating an intake parameter indicative of a state of air in an intake passage in the engine in which an amount of air passing through an intake throttle valve is changed, as a passing air amount, by the intake throttle valve disposed in the intake passage, comprising:

basic intake parameter-calculating means for calculating a basic intake parameter as a basic value of the intake parameter;

first opening function value-calculating means for calculating a first opening function value as a first calculated value of an opening function value, using a model equation derived by a predetermined modeling method and defining a relationship between an upstream-side pressure which is a pressure in the intake passage on an upstream side of the intake throttle valve, a downstream-side pressure which is a pressure in the intake passage on a downstream side of the intake throttle valve, the opening function value determined by a degree of opening of the intake throttle valve, and the passing air amount;

second opening function value-calculating means for calculating a second opening function value as a second calculated value of the opening function value, using a correlation model representative of a correlation between the degree of opening of the intake throttle valve and the opening function value;

correction value-calculating means for calculating a correction value using a function value ratio which is a ratio between one and the other of the calculated first opening function value and the calculated second opening function value; and intake parameter-calculating means for calculating the intake parameter by correcting the basic intake parameter using the calculated correction value.

2. The intake parameter-calculating device as claimed in claim 1, wherein said basic intake parameter-calculating means includes basic passing air amount-calculating means for calculating a basic passing air amount which is a basic value of the passing air amount, as the basic intake parameter, wherein said correction value-calculating means includes first correction value-calculating means for calculating a first correction value for correcting the basic passing air amount, as the correction value, and wherein said intake parameter-calculating means includes passing air amount-calculating means for calculating the passing air amount, as the intake parameter, by correcting the calculated basic passing air amount by the calculated first correction value.

3. The intake parameter-calculating device as claimed in claim 2, wherein said first correction value-calculating means includes onboard identification means for identifying onboard a model parameter of an error model equation that defines a relationship between an error and the degree of opening of the intake throttle valve when the function value ratio is regarded as the error, and calculates the first correction value using the model parameter identified onboard and the error model equation.

4. The intake parameter-calculating device as claimed in claim 3, wherein said onboard identification means sets a plurality of weights in a manner associated with a plurality of regions into which the opening of the intake throttle valve is divided, respectively, and calculates an identified value of the model parameter with an identifying calculation algorism to which a weighting process using the plurality of weights is applied, and wherein the plurality of weights are set to values equal to each other.

5. The intake parameter-calculating device as claimed in claim 3, wherein said onboard identification means sets a plurality of weights in a manner associated with a plurality of regions into which the opening of the intake throttle valve is divided, respectively, and calculates an identified value of the model parameter with an identifying calculation algorism to which a weighting process using the plurality of weights is applied, and wherein the plurality of weights are set such that a weight for a region becomes larger as the degree of opening of the intake throttle value of the region is smaller.

6. The intake parameter-calculating device as claimed in claim 2, wherein the engine is used as a motive power source of a vehicle, and wherein said first correction value-calculating means executes calculation of the first correction value when one of a condition that a predetermined time period has not elapsed after a time point of starting the engine and a condition that a total travelled distance of the vehicle after starting the engine is smaller than a predetermined value is satisfied.

7. The intake parameter-calculating device as claimed in claim 2, further comprising estimated upstream-side pressure-calculating means for calculating an estimated upstream-side pressure as an estimated value of the upstream-side pressure, and wherein said first opening function value-calculating means calculates the first opening function value using the calculated estimated upstream-side pressure and the model equation.

8. The intake parameter-calculating device as claimed in claim 7, further comprising downstream-side pressure-detecting means for detecting the downstream-side pressure, and wherein said estimated upstream-side pressure-calculating means sets the estimated upstream-side pressure to a downstream-side pressure detected by said downstream-side pressure-detecting means when the engine is started.

9. The intake parameter-calculating device as claimed in claim 7, further comprising:

intake air amount-detecting means disposed in the intake passage at a location upstream of the intake throttle valve, for outputting a detection signal indicative of an intake air amount which is an amount of air flowing through the intake passage; and intake air amount-calculating means for calculating the intake air amount based on a result of detection by said intake air amount-detecting means, and wherein said estimated upstream-side pressure-calculating means calculates an estimated passing air amount which is an estimated value of the passing air amount, using the first correction value and the model equation, and updates the estimated upstream-side pressure based on a result of comparison between the estimated passing air amount and the calculated intake air amount.

10. The intake parameter-calculating device as claimed in claim 2, wherein said first correction value-calculating means includes:

arithmetic mean value-calculating means for calculating an arithmetic mean value of one of the function value ratio and the first correction value in a manner associated with each of values of the degree of opening of the intake throttle valve set at predetermined intervals thereof; and storage means for storing the calculated arithmetic mean values in a manner associated with each of values of the degree of opening of the intake throttle valve set at the predetermined intervals thereof, as storage values, and wherein the storage value read from said storage means according to the degree of opening of the intake throttle valve is used as the one of the function value ratio and the first correction value.

11. The intake parameter-calculating device as claimed in claim 2, further comprising:

intake air amount-detecting means disposed in the intake passage at a location upstream of the intake throttle valve, for outputting a detection signal indicative of an intake air amount which is an amount of air flowing through the intake passage;

upstream-side pressure-detecting means for outputting a detection signal indicative of the upstream-side pressure;

downstream-side pressure-detecting means for outputting a detection signal indicative of the downstream-side pressure;

pressure ratio-calculating means for calculating a pressure ratio which is a ratio between the downstream-side pressure and the upstream-side pressure, based on results of detection by said upstream-side pressure-detecting means and said downstream-side pressure-detecting means; and valve opening-detecting means for detecting a valve opening degree as the degree of opening of the intake throttle valve, and wherein said basic intake parameter-calculating means further includes basic intake air amount-calculating means for calculating a basic intake air amount which is a basic value of the intake air amount, as the basic intake parameter, based on a result of detection by said intake air amount-detecting means, wherein said correction value-calculating means further includes second correction value-calculating means for calculating a second correction value for correcting the basic intake air amount, as the correction value, when the detected valve opening degree is not smaller than a predetermined valve opening degree and at the same time the calculated pressure ratio is smaller than a critical pressure ratio, wherein said intake parameter-calculating means further comprises intake air amount-calculating means for calculating the intake air amount, as the intake parameter, by correcting the basic intake air amount using the calculated second correction value, and wherein said first opening function value-calculating means calculates the first opening function value, by using the intake air amount as the passing air amount.

12. The intake parameter-calculating device as claimed in claim 11, wherein said basic intake parameter-calculating means further includes basic downstream-side pressure-calculating means for calculating a basic downstream-side pressure which is a basic value of the downstream-side pressure, as the basic intake parameter, based on a result of detection by said downstream-side pressure-detecting means, wherein said correction value-calculating means further comprises third correction value-calculating means for calculating a third correction value for correcting the basic downstream-side pressure, as the correction value, when the pressure ratio is not smaller than the critical pressure ratio, and wherein said intake parameter-calculating means further includes downstream-side pressure-calculating means for calculating the downstream-side pressure, as the intake parameter, by correcting the basic downstream-side pressure using the calculated third correction value.

13. The intake parameter-calculating device as claimed in claim 2, further comprising:

intake air amount-detecting means disposed in the intake passage at a location upstream of the intake throttle valve, for outputting a detection signal indicative of an intake air amount which is an amount of air flowing through the intake passage;

upstream-side pressure-detecting means for outputting a detection signal indicative of the upstream-side pressure;

downstream-side pressure-detecting means for outputting a detection signal indicative of the downstream-side pressure;

pressure ratio-calculating means for calculating a pressure ratio which is a ratio between the downstream-side pressure and the upstream-side pressure, based on results of detection by said upstream-side pressure-detecting means and said downstream-side pressure-detecting means; and valve opening-detecting means for detecting a valve opening degree as the degree of opening of the intake throttle valve, and wherein said basic intake parameter-calculating means further includes basic downstream-side pressure-calculating means for calculating a basic downstream-side pressure which is a basic value of the downstream-side pressure, as the basic intake parameter, based on a result of detection by said downstream-side pressure-detecting means, when the calculated pressure ratio is not smaller than a critical pressure ratio, wherein said correction value-calculating means further includes third correction value-calculating means for calculating a third correction value for correcting the basic downstream-side pressure, as the correction value, when the pressure ratio is not smaller than the critical pressure ratio, and wherein said intake parameter-calculating means further includes downstream-side pressure-calculating means for calculating the downstream-side pressure, as the intake parameter, by correcting the basic downstream-side pressure using the calculated third correction value, when the pressure ratio is not smaller than the critical pressure ratio.

14. The intake parameter-calculating device as claimed in claim 1, further comprising:

intake air amount-detecting means disposed in the intake passage at a location upstream of the intake throttle valve, for outputting a detection signal indicative of an intake air amount which is an amount of air flowing through the intake passage;

upstream-side pressure-detecting means for outputting a detection signal indicative of the upstream-side pressure;

downstream-side pressure-detecting means for outputting a detection signal indicative of the downstream-side pressure;

pressure ratio-calculating means for calculating a pressure ratio which is a ratio between the downstream-side pressure and the upstream-side pressure, based on results of detection by said upstream-side pressure-detecting means and said downstream-side pressure-detecting means; and valve opening-detecting means for detecting a valve opening degree as the degree of opening of the intake throttle valve, and wherein said basic intake parameter-calculating means includes basic intake air amount-calculating means for calculating a basic intake air amount which is a basic value of the intake air amount, as the basic intake parameter, based on a result of detection by said intake air amount-detecting means, wherein said correction value-calculating means further includes second correction value-calculating means for calculating a second correction value for correcting the basic intake air amount, as the correction value, when the detected valve opening degree is not smaller than a predetermined valve opening degree and at the same time the calculated pressure ratio is smaller than a critical pressure ratio, wherein said intake parameter-calculating means includes intake air amount-calculating means for calculating the intake air amount, as the intake parameter, by correcting the basic intake air amount using the calculated second correction value, and wherein said first opening function value-calculating means calculates the first opening function value by using the intake air amount as the passing air amount.

15. The intake parameter-calculating device as claimed in claim 14, wherein said basic intake parameter-calculating means further includes basic downstream-side pressure-calculating means for calculating a basic downstream-side pressure which is a basic value of the downstream-side pressure, as the basic intake parameter, based on a result of detection by said downstream-side pressure-detecting means, when the pressure ratio is not smaller than the ratio, wherein said correction value-calculating means further includes third correction value-calculating means for calculating a third correction value for correcting the basic downstream-side pressure, as the correction value, when the pressure ratio is not smaller than the critical pressure ratio, and wherein said intake parameter-calculating means further includes downstream-side pressure-calculating means for calculating the downstream-side pressure, as the intake parameter, by correcting the basic downstream-side pressure using the calculated third correction value, when the pressure ratio is not smaller than the critical pressure ratio.

16. The intake parameter-calculating device as claimed in claim 1, further comprising:

upstream-side pressure-detecting means for outputting a detection signal indicative of the upstream-side pressure;

upstream-side pressure-calculating means for calculating the upstream-side pressure based on a result of detection by said upstream-side pressure-detecting means;

downstream-side pressure-detecting means for outputting a detection signal indicative of the downstream-side pressure; and pressure ratio-calculating means for calculating a pressure ratio which is a ratio between the downstream-side pressure and the upstream-side pressure, based on results of detection by said upstream-side pressure-detecting means and said downstream-side pressure-detecting means, and wherein said basic intake parameter-calculating means further includes basic downstream-side pressure-calculating means for calculating a basic downstream-side pressure which is a basic value of the downstream-side pressure, as the basic intake parameter, based on a result of detection by said downstream-side pressure-detecting means, when the pressure ratio is not smaller than the ratio, wherein said correction value-calculating means further includes third correction value-calculating means for calculating a third correction value for correcting the basic downstream-side pressure, as the correction value, when the pressure ratio is not smaller than a critical pressure ratio, and wherein said intake parameter-calculating means further includes downstream-side pressure-calculating means for calculating the downstream-side pressure, as the intake parameter, by correcting the basic downstream-side pressure using the calculated third correction value, when the pressure ratio is not smaller than the critical pressure ratio.

17. An intake parameter-calculating method for an internal combustion engine, for calculating an intake parameter indicative of a state of air in an intake passage in the engine in which an amount of air passing through an intake throttle valve is changed, as a passing air amount, by the intake throttle valve disposed in the intake passage, comprising:

calculating a basic intake parameter as a basic value of the intake parameter;

calculating a first opening function value as a first calculated value of an opening function value, using a model equation derived by a predetermined modeling method and defining a relationship between an upstream-side pressure which is a pressure in the intake passage on an upstream side of the intake throttle valve, a downstream-side pressure which is a pressure in the intake passage on a downstream side of the intake throttle valve, the opening function value determined by a degree of opening of the intake throttle valve, and the passing air amount;

calculating a second opening function value as a second calculated value of the opening function value, using a correlation model representative of a correlation between the degree of opening of the intake throttle valve and the opening function value;

calculating a correction value using a function value ratio which is a ratio between one and the other of the calculated first opening function value and the calculated second opening function value; and calculating the intake parameter by correcting the basic intake parameter using the calculated correction value.

* * * * *